United States Patent
Iida

(10) Patent No.: US 6,377,525 B1
(45) Date of Patent: Apr. 23, 2002

(54) OPTICAL DISC APPARATUS AND METHOD FOR READING INFORMATION

(75) Inventor: Michihiko Iida, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/717,627

(22) Filed: Nov. 21, 2000

(30) Foreign Application Priority Data

Nov. 22, 1999 (JP) ............................................ 11-331784

(51) Int. Cl.$^7$ ................................................. G11B 7/00
(52) U.S. Cl. ...................... 369/47.17; 369/32; 369/53.1; 369/59.1
(58) Field of Search ........................ 369/32, 47.1, 47.11, 369/47.16, 47.17, 47.15, 47.18, 53.1, 53.11, 53.41, 59.1, 59.11

(56) References Cited

U.S. PATENT DOCUMENTS 5,166,914 A * 11/1992 Shimada et al. .......... 369/47.17
5,616,390 A * 4/1997 Miyagawa et al. .. 369/275.3 X
5,953,310 A * 9/1999 Miyamoto et al. ....... 369/275.3

* cited by examiner

Primary Examiner—Muhammad Edun

(74) Attorney, Agent, or Firm—Oblon, Spivak, McClelland, Maier & Neustadt, P.C.

(57) ABSTRACT

The objective of the present invention is to prevent the occurrence of crosstalk between adjacent pregrooves, even if the light beam is applied across the adjacent information recording layers in accordance with the increase in a storage density of the optical disc.

According to the present invention, an optical disc reproducing apparatus includes: an information reading device 6 for emitting a light beam L to an optical disc 10, so as to read a target pre-format address and recorded information from the optical disc 10 and to output the read information Z0; and an operation device 7 for operating addresses adjacent to the target pre-format address, which has been input from the information reading device 6, at its inner and outer peripheral sides, and after that, for operating interference information generated by the target pre-format addresses adjacent to the target pre-format address at its inner and outer peripheral sides to subtract the interference information from the read information obtained from the target pre-format address. Due to this structure, the interference information generated by the pre-format addresses adjacent to the target pre-format address at its inner and outer peripheral sides can be removed from the read information Z0 read from the optical disc 10. As a result, only the information recorded in the target pre-format address can be obtained.

4 Claims, 13 Drawing Sheets

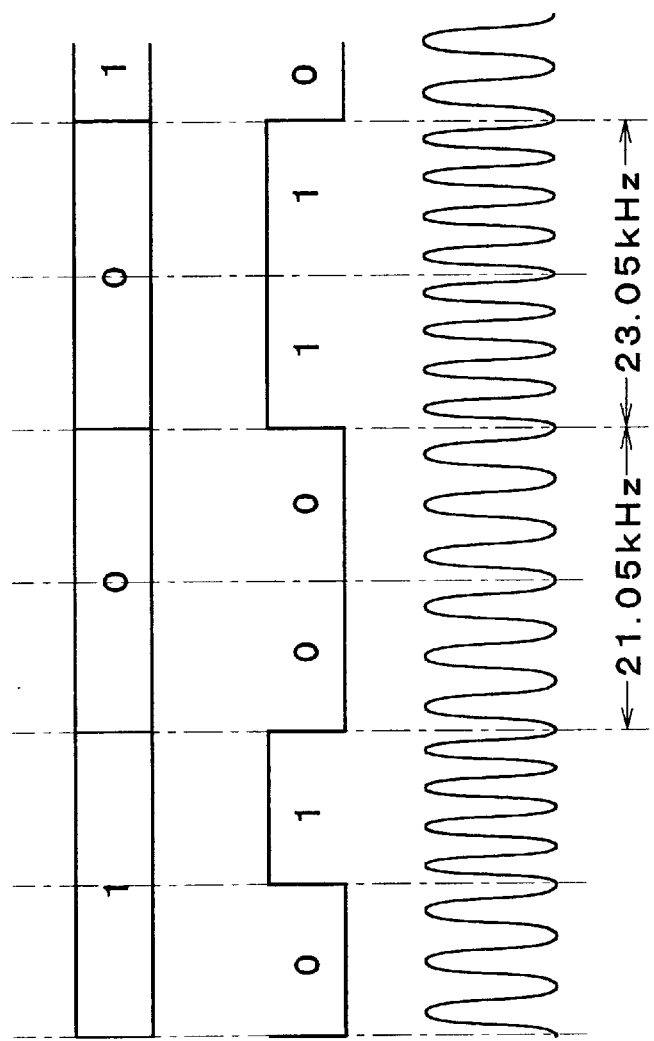

F I G. 1 0
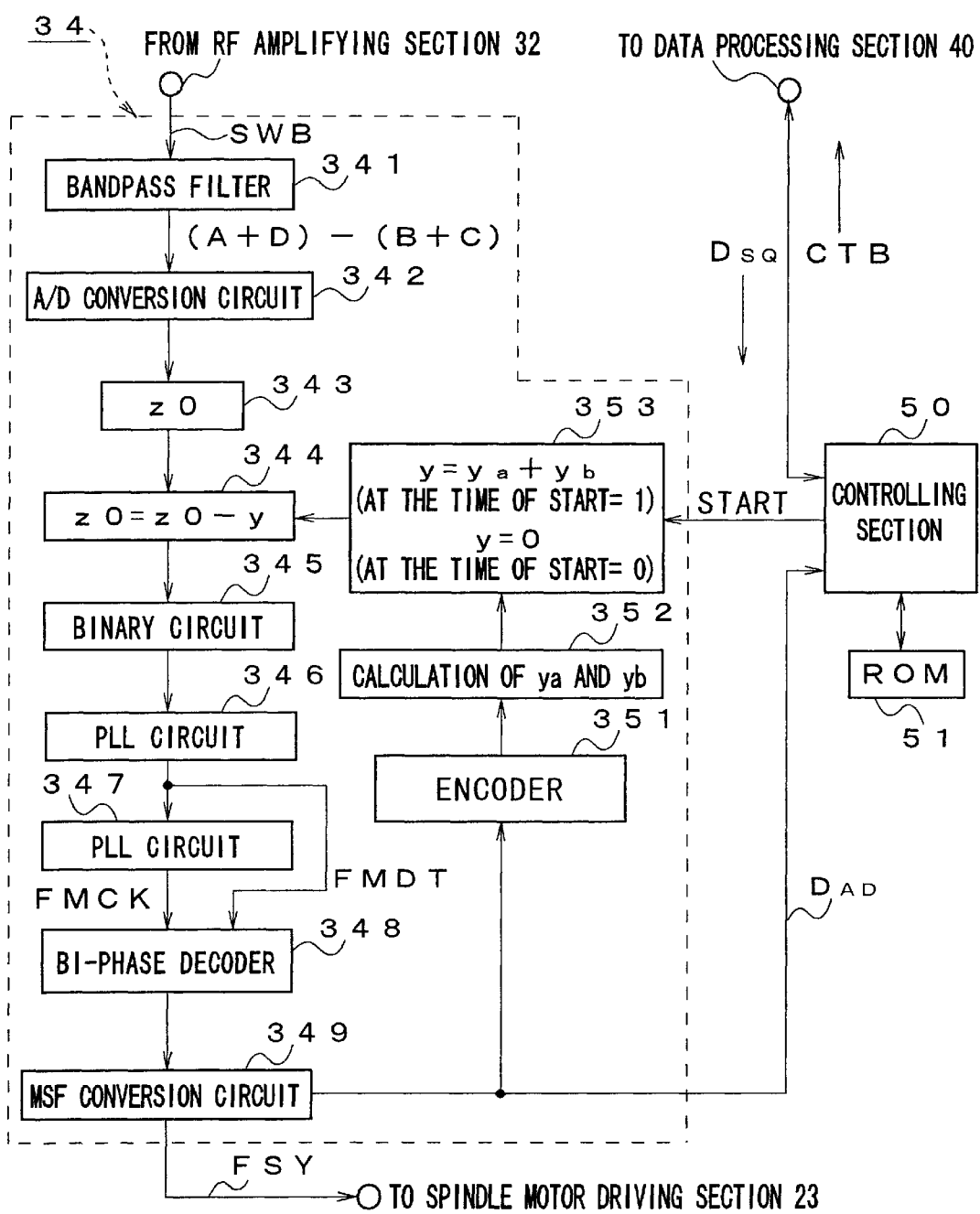

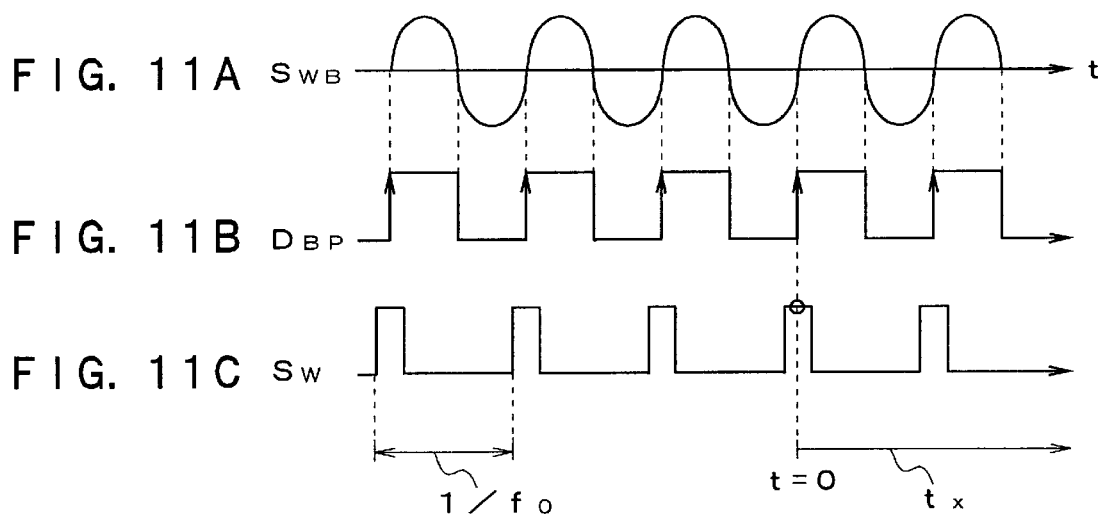

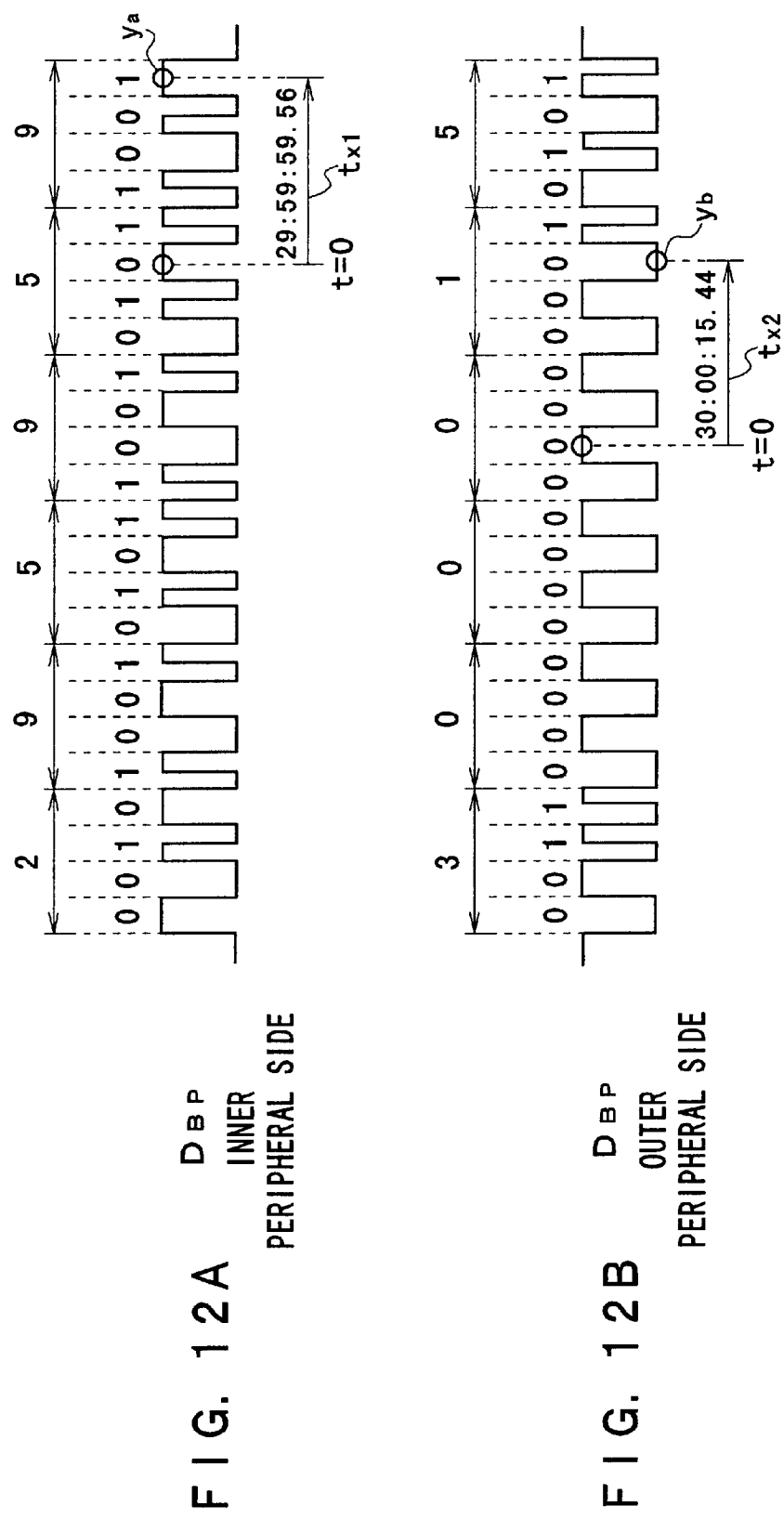

OPTICAL DISC APPARATUS AND METHOD FOR READING INFORMATION

BACKGROUND OF THE INVENTION

1. Field of the Invention

The present invention relates to an optical disc recording and reproducing apparatus preferable when used for a writable optical disc such as a write once optical disc (CD-R, DVD-R), a rewritable optical disc (CD-RW), and a mini-disc (MD), and a method for reading information.

Specifically, in the present invention, an operation device for operating interference information generated by pre-format addresses in information recording layers adjacent to a target pre-format address is provided. By providing the operation device, the interference information generated by the pre-format addresses adjacent to the target pre-format address at its inner and outer peripheral sides is removed from the read information of the target pre-format address. In this manner, only the information recorded in the target pre-format address can be read. At the same time, even if the light beam is applied across the adjacent information recording layers in accordance with the increase in a storage density of the optical disc, the occurrence of crosstalk can be prevented.

2. Description of the Related Art

In recent years, as information media for editing and recording audio information in such a manner as to suit the preferences of listeners, writable optical discs such as write once optical discs (CD-R, DVD-R), rewritable optical discs (CD-RW), and mini-disc (MD) standardized in ISO/IEC13490-1 are increasingly used. In each of these optical discs 10, as shown in FIG. 1A, grooves 1 for guiding a light beam (hereinafter, referred to as pregrooves) are formed, and a positioning method referred to as a tracking servo is employed. The tracking servo is a mechanism where pits and projections constituting lands 2 formed on both sides of each pregroove 1 are detected to decide the position of an optical pickup, so that the desired pregroove 1 is accurately irradiated with a laser beam.

Sloped surfaces of the land, which coincide to both side surfaces of the pregroove 1, is formed with a slight wobble in the form of sine wave in-phase with each other as shown in FIG. 1B. The wobble signal indicating the wobble component has been subjected to FM modulation. In the wobble signal, time axis information which indicates the position on the optical disc 10, and a recommended value of the power of the laser beam optimum for recording are encoded.

This time axis information is referred to as ATIP (absolute time in pregroove) information, and is written as an absolute time information in the signal recording region (i.e. a program region) of the optical disc 10 along a direction from the starting point at its inner peripheral side toward its outer peripheral side. The ATIP information is written in the processing of the CD-R and CD-RW. The ATIP information is written in the optical disc 10 such as CD-R, CD-RW, and MD-R in a modulation method referred to as bi-phase modulation mode. In this mode, a baseband modulation is conducted where, depending on whether the waveform of the last pulse signal constituting the error correction information of the immediately preceding pre-format address ends at a high level or low level, the pre-format address in the next frame is connected without being inverted, or the pre-format address is inverted and connected.

The ATIP information is written, for example, in the side surfaces Us, Ut of the pregroove 1 between two lands 2a, 2b shown in FIG. 1B. That is, the ATIP information is written in the side surface Us of the land 2a located at the inner peripheral side of the pregroove 1 in which data is recorded, and in the side surface Ut of the land 2b located at the outer peripheral side of the pregroove 1 in such a manner that the ATIP information written in the side surface Us is synchronous to the ATIP information written in the side surface Ut.

Therefore, the ATIP information can be read as a wobble signal by detecting the reflected light from the main spot 4 on the wobble formed in the lands 2a, 2b by two light receiving elements split in the direction of track. The preceding side spot 3 is a light beam preceding the main spot 4 which is a light beam used for recording information. The broken line circles in FIG. 1B show spot diameters of the light beam applied to the optical disc having a standard density. The two-dot long and two short dashes line circles show a light beam of which irradiation diameter is relatively enlarged as the pregrooves are formed so as to be closer to each other in accordance with the increase in a storage density of the optical disc 10. This problem arises because there is a limitation on enlarging the spot diameters of the light beam.

The wobble formed in the land 2a located at the inner peripheral side is detected as a wobble signal by the posterior side spot 5. The wobble signal is produced in such a manner that its center frequency becomes 22.05 kHz for example, when the optical disc 10 is rotated at a standard velocity (CLV) of a compact disc (CD). One sector of the ATIP information is constituted in such a manner as to coincide to one data sector after the signal is recorded. Therefore, at the time of recording information, the pregrooves 1 are irradiated with a light beam with a predetermined intensity and information is written therein while the sector of the ATIP information is synchronous with the data sector.

In a conventional method for reading information, if information is read based on the pre-format addresses which are written in the bi-phase modulation mode as it is without conducting any processing in the recent situation where the lands 2a, 2b are arranged at narrower pitches (hereinafter, also referred to as track pitches in some cases) P in accordance with the increase in the storage density of the optical disc 10, the light beam of which irradiation diameter is relatively enlarged as the pregrooves 1 are formed so as to be closer to each other is applied across the adjacent pregrooves 1 (see FIG. 1B).

In other words, even if the main spot 4 is in the shape of a complete circle, when the spot diameter is larger than the track pitches P, a leakage from the adjacent track occurs. In this case, there is much fear that a crosstalk is generated. The crosstalk causes a phase modulation to create jitter, and as a result, the signal-noise (S/N) ratio is lowered.

As a result, when the bi-phase signal constituting the target pre-format address at the reading point is superposed onto the bi-phase signal of the other pre-format address adjacent to the target pre-format address, there arises a problem that the phase difference therebetween is large, and larger jitter is created as the period of the high-level is shorter.

In addition, if it is attempted to obtain time axis information by use of the return light from the main spot 4 while forming the pit 61 in the main spot 4, a high speed AGC and a divider are required, and the structure of the apparatus becomes complicated. When the signal is written at a speed higher than a standard speed, the light amount of return light is fluctuated by the influence of the formation of pit, even if the power of the laser beam is lowered from the signal writing level to the signal reading level by sampling and holding the signal. In this case, there is a fear that the time axis information cannot be read accurately.

SUMMARY OF THE INVENTION

The present invention has been conducted to solve the above-described problems of the prior arts, and the objective thereof is to provide an optical disc recording and reproducing apparatus from which the target pre-format address and the recorded information can be read with excellent reproducibility, as well as being capable of preventing the occurrence of crosstalk in adjacent pregrooves, even if a light beam is applied across adjacent information recording layers in accordance with the increase in the storage density of the optical disc, and a method for reading information.

The above-described problems can be solved by an optical disc reproducing apparatus for reading information from an optical disc formed with addresses beforehand, and into which information has been recorded based on the addresses. And the optical disc reproducing apparatus includes: an information reading device for emitting a light beam to an optical disc, so as to read a target address and recorded information from the optical disc and to output the read information; and an operation device for operating the addresses adjacent to the target address, which has been input from the information reading device, at its inner and outer peripheral sides, and after that for operating interference information generated by the addresses adjacent to the target address at its inner and outer peripheral sides to subtract the interference information from the read information of the target address.

According to an optical disc reproducing apparatus of present information, when information is read from the optical disc into which the information has been recorded based on the addresses, the optical disc is irradiated with a light beam, so as to read the target address and the recorded information from the optical disc by the information reading device. Then, the read information is output to the operation device. In the operation device, the addresses adjacent to the target address at its inner and outer peripheral sides are operated based on the read information, so as to operate the interference information generated by the addresses adjacent to the target address at its inner and outer peripheral sides. After that, the interference information is subtracted from the read information of the target address.

Accordingly, the interference information by the pre-format addresses adjacent to the target pre-format address at its inner and outer peripheral sides is removed from the information read from the optical disc, and whereby only the information recorded in the target pre-format address can be taken out. As a result, even if the light beam is applied across the information recording layers adjacent to each other in accordance with the increase in the recording density of the optical disc, the occurrence of crosstalk can be prevented.

According to a method for reading information of the present invention, information is read from an optical disc having addresses formed beforehand, and the information has been recorded in the optical disc based on the addresses. And the optical disc is irradiated with a light beam, so as to read the target address and the recorded information from the optical disc to obtain read information. Based on thus-obtained read information, the addresses adjacent to the target address at its inner and outer peripheral sides are operated, and then the interference information generated by the addresses adjacent to the target address at its inner and outer peripheral sides is operated. Then, the interference information is subtracted from the read information of the target address.

According to a method for reading information of the present invention, the interference information generated by the addresses adjacent to the target address at its inner and outer peripheral sides are subtracted from the read information of the target address. With this arrangement, only the information recorded in the target address can be obtained from the information read from the optical disc. In this manner, even if the light beam is applied across the adjacent information recording layers in accordance with the increase in a storage density of the optical disc, the occurrence of crosstalk can be prevented.

BRIEF DESCRIPTION OF THE DRAWINGS

FIGS. 7A to 7C are waveform diagrams showing an exemplary relationship between ATIP information, a bi-phase signal DBP, and a wobble signal SWB;

FIG. 10 is a block diagram showing an exemplary inner structure of an ATIP decoder 34 as an operation device to which a wobble signal SWB is supplied;

FIGS. 11A to 11C are wave form diagrams each showing an exemplary calculation to obtain a phase of a wobble signal SWB at a current position.

FIGS. 12A and 12B are diagrams each showing an exemplary waveform of a bi-phase signal DBP for pre-format addresses at inner and outer peripheral sides;

DESCRIPTION OF THE PREFERRED EMBODIMENT

Next, an optical disc apparatus and a method for reading information according to an embodiment of the present invention will be described with reference to drawings.

(1) Embodiment

Figure 1A:
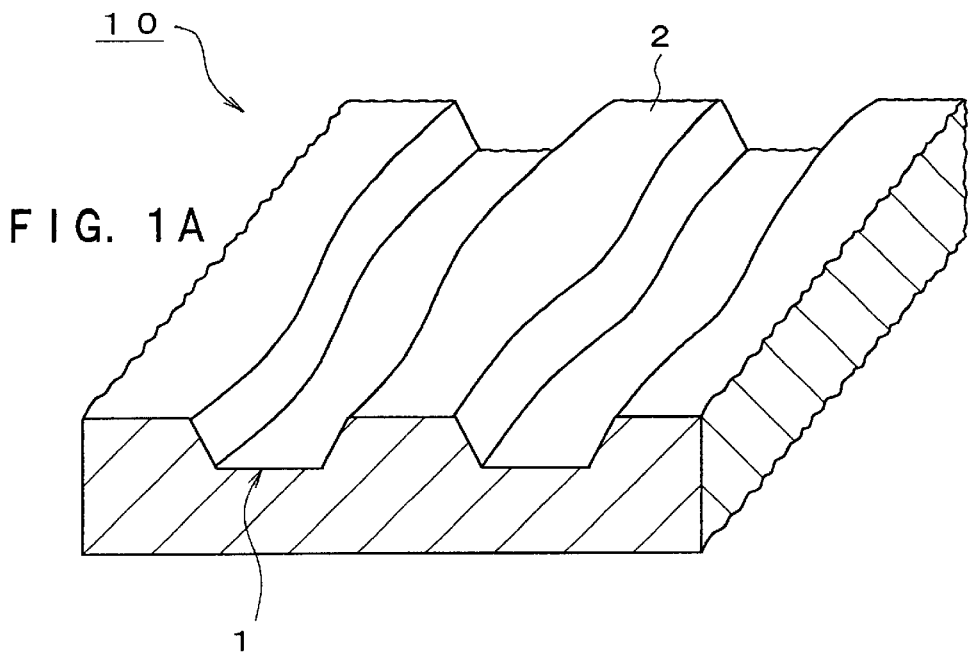
FIG. 1A is a drawing showing an exemplary structure of an optical disc 10 according to a conventional example.
Figure 1B:
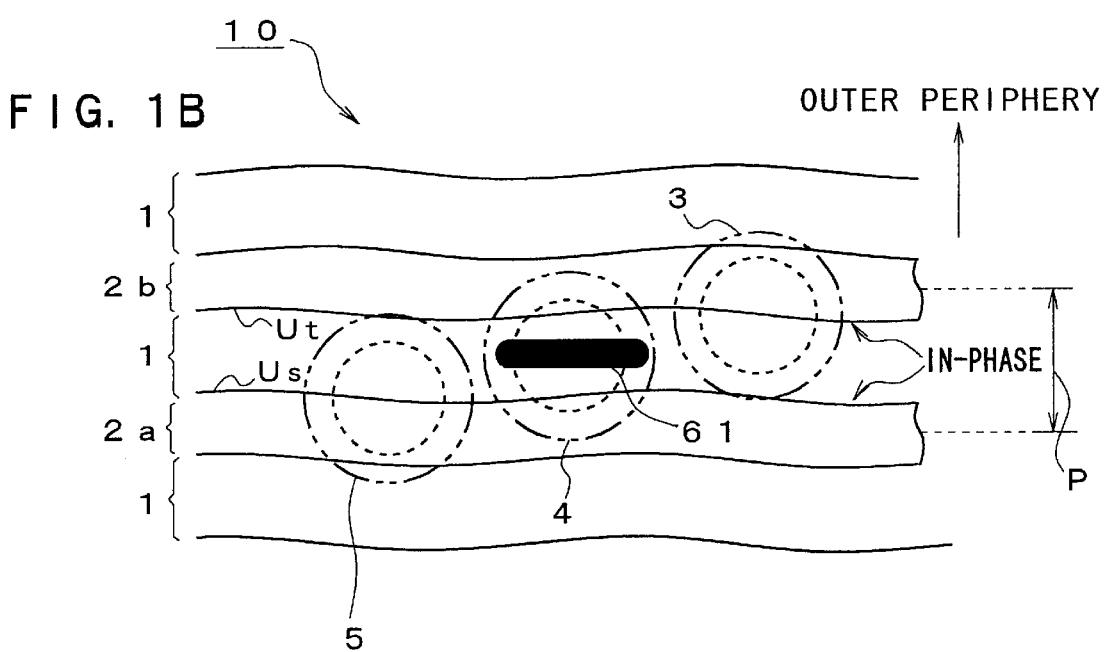
FIG. 1B is a diagram showing an example of the irradiation of a light beam.
Figure 2:
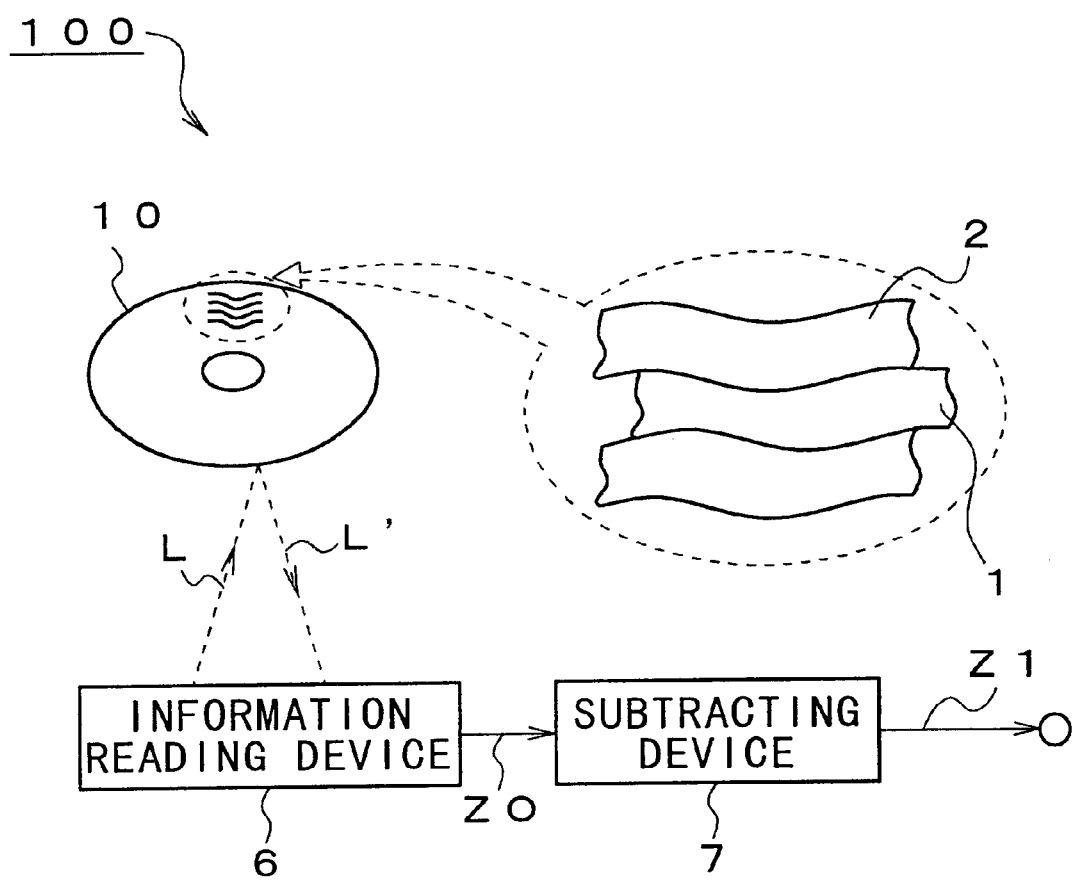
FIG. 2 is a perspective view showing an exemplary structure of an optical disc recording and reproducing apparatus 100 according to an embodiment of the present invention.

FIG. 2 is a block diagram showing an exemplary structure of an optical disc recording and reproducing apparatus 100 according to an embodiment of the present invention.

In this embodiment, an operation device for operating interference information generated by pre-format addresses in information recording layers adjacent to a target pre-format address is provided. By providing the operation device, the interference information generated by the pre-format addresses adjacent to the target pre-format address at its inner and outer peripheral sides is removed from the read information of the target pre-format address. In this manner, only the information recorded in the target pre-format address can be read. At the same time, even if the light beam is applied across the adjacent information recording layers in accordance with the increase in a storage density of the optical disc, the occurrence of crosstalk can be prevented.

An optical disc recording and reproducing apparatus 100 shown in FIG. 2 reads at least recorded information from an optical disc 10 based on pre-format addresses. Obviously, the recorded information has been recorded in the optical disc 10 beforehand based on the pre-format addresses. For example, in the case where the optical disc 10 is CD-R, DVD-R, CD-RW, or MD-R, its disc-shaped substrate is formed with pregrooves 1 in the form of pits and lands 2 in the shape of projections. The recorded information is written in the grooved portions of the pregrooves 1, and the pre-format addresses of the recorded information are frequency-modulated and are written so as to be wobbled (i.e. serpentine) on the side surfaces of each land 2 which coincide to each of the side surfaces of each pregroove 1.

The optical disc recording and reproducing apparatus 100 has an information reading device 6. The information reading device 6 emits a light beam L to the optical disc 10, so as to detect the return light L' reflected by the optical disc 10. In this manner, the target pre-format address and the recorded information are read, and the read information Z0 is output. The read information Z0 contains, in many cases, the components of the pre-format addresses adjacent to the target pre-format address at its inner and outer peripheral sides when the light beam L is applied across adjacent information recording layers in accordance with the increase in the storage density of the optical disc 10.

Therefore, in this embodiment, an operation device 7 is connected to the information reading device 6, and read information Z0 is input into the operation device 7. In the operation device 7 into which the read information Z0 has been input, the pre-format addresses adjacent to the target pre-format address at its inner and outer peripheral sides are operated. After that, the interference information y by the pre-format addresses adjacent to the target pre-format address at its inner and outer peripheral sides is operated. Then, the interference information y is subtracted from the read information Z0 of the target pre-format address Z0. The operation device 7 is controlled to output the recorded information Z0–y.

Next, an exemplary action of an optical disc recording and reproducing apparatus 100 according to an embodiment of the present invention will be described. FIG. 2 is a flow chart showing an exemplary processing by a method for reading information according to an embodiment. In this embodiment, the description is made on an assumption that, when recorded information Z1 is read from the optical disc 10 based on the pre-format addresses, or information is recorded in the optical disc 10, the recorded information has been recorded beforehand in the pre-format addresses.

Based on the above-described assumption, the recorded information is read from the optical disc in the following procedure. First, in Step A1 in the flow chart of FIG. 2, a light beam L is applied to the optical disc 10 by the information reading device 6, and the return light L' reflected by the optical disc 10 is detected. As a result, the target pre-format address and the recorded information can be obtained, and the read information Z0 thereof is output to the operation device 7. In Step A2, the pre-format addresses adjacent to the target pre-format address at its inner and outer peripheral sides are operated by the operation device 7.

After that, in Step A3, the interference information y generated by the pre-format addresses adjacent to the target address at its inner and outer peripheral sides are operated by the operation device 7. Then, in Step A4, the interference information y is subtracted from the read information Z0 of the target pre-format address. In Step A5, it is judged whether or not the processing of reading information has been finished or not. This judgement is conducted based on a control command provided from a controlling section of high order. When no control command for finishing the information reading is received, the procedure returns to Step A1 and the processing of reading information is continued. When a command for finishing the information reading is provided from the controlling section 50, the processing of reading information is finished.

In the above-described manner, the interference information y generated by the pre-format addresses adjacent to the target pre-format address at its inner and outer peripheral side is removed from the information Z0 read from the optical disc 10, and whereby only the information Z1 recorded in the target pre-format address can be taken out. As a result, even if the light beam L is applied across the information recording layers adjacent to each other in accordance with the increase in the recording density of the optical disc, the occurrence of crosstalk can be prevented.

(2) First Example

Figure 4:
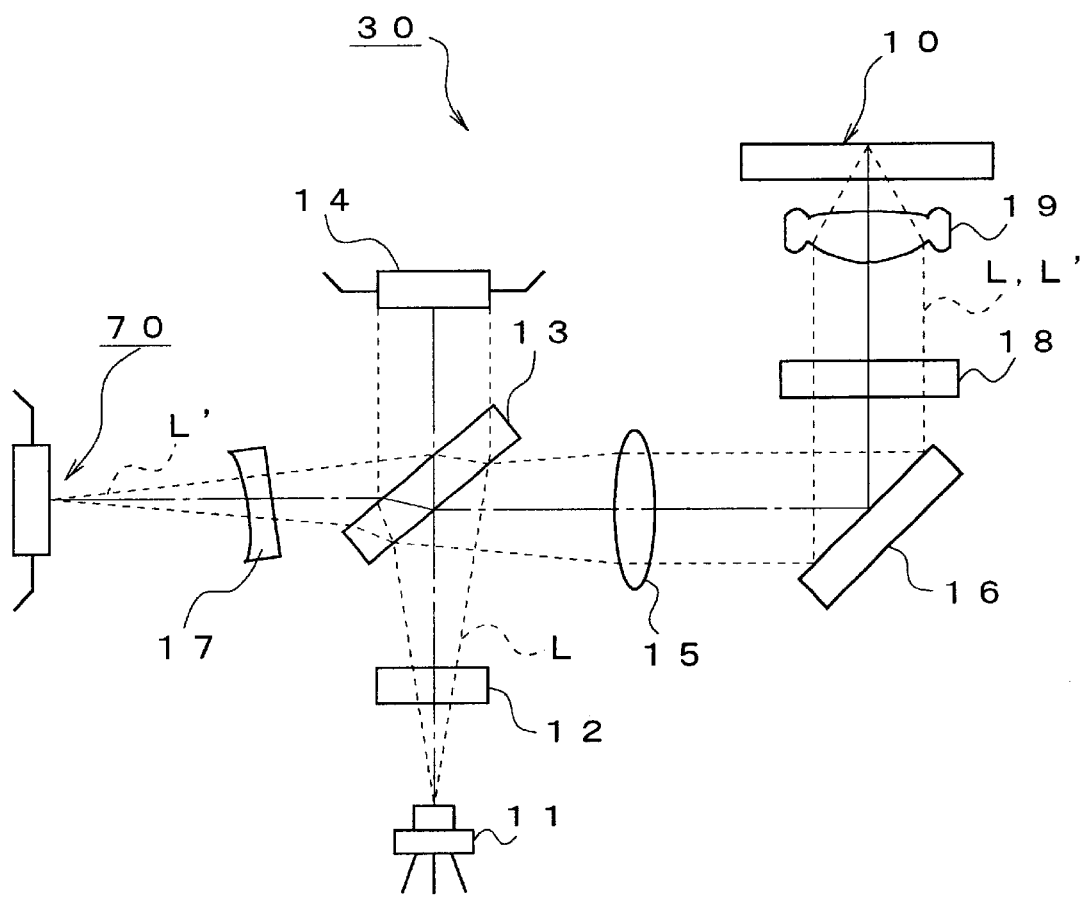
FIG. 4 is a conceptual diagram showing an exemplary structure of an optical pickup 30 as an information reading device to be mounted to each of an optical disc recording and reproducing apparatuses 201, and 202 according to each example.
Figure 5:
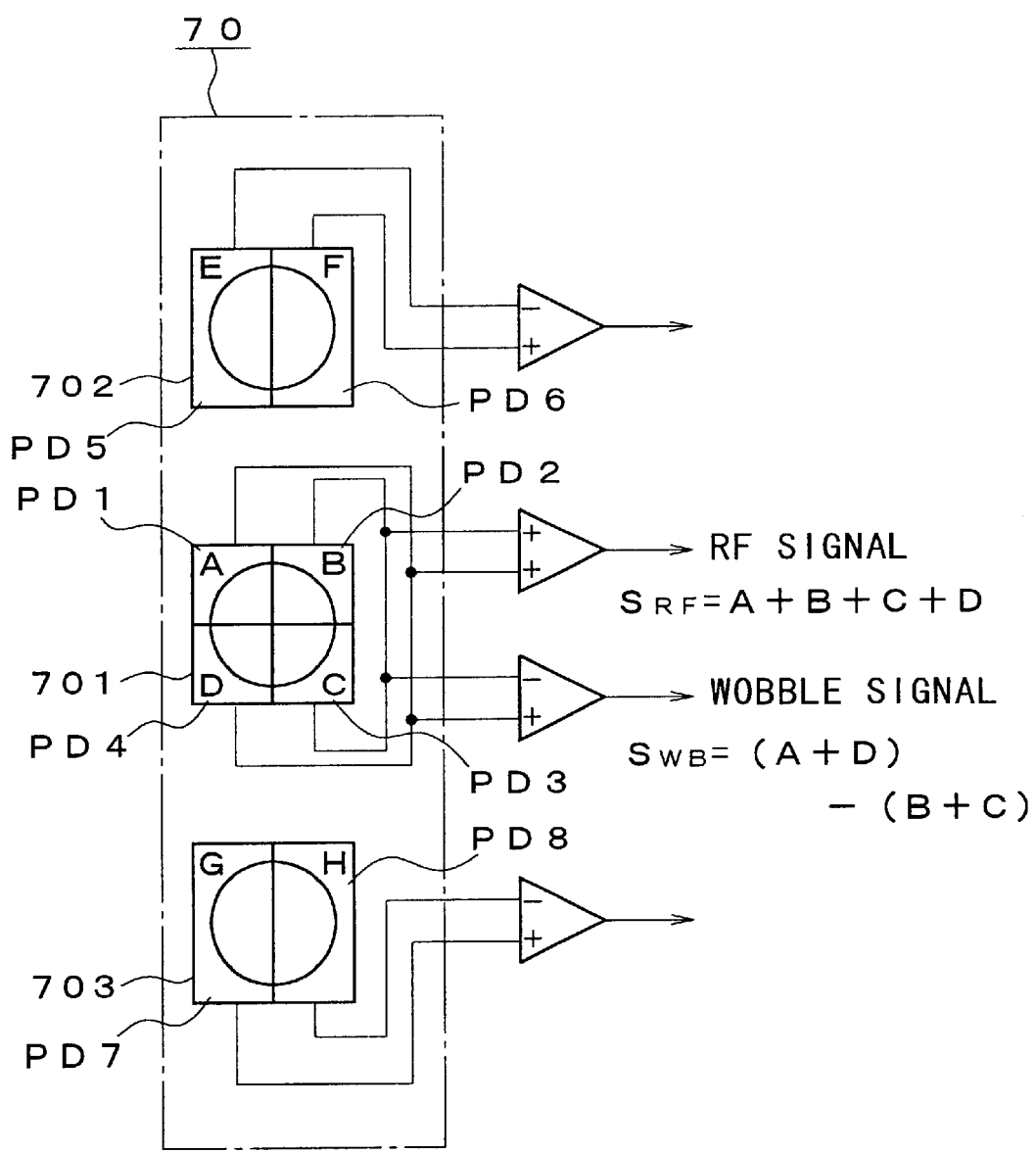
FIG. 5 is a conceptual diagram showing an exemplary structure of a photodetecting section 70 according to each example.

FIG. 4 is a conceptual diagram showing an exemplary structure of an optical pickup 30 as an information reading device to be mounted to each of optical disc recording and reproducing apparatuses 201, 202 according to an example. FIG. 5 is a conceptual diagram showing an exemplary structure of the photodetecting section 70 thereof.

The optical pickup 30 shown in FIG. 4 has a laser emission source 11 as an example of an information reading device 6. As the laser emission source 11, a GaAs semiconductor laser having a wavelength of about 780 nm and the like is used. The laser emission source 11 emits a laser beam L which constitutes a main spot created in a three beam method. The laser emission source 11 has an optical axis. On the optical axis, a grating (i.e. a diffraction grating) 12, a beam splitter 13, and a light receiving element 14 for front monitor which constitute an optical system together are provided. In the grating 12, the laser beam L emitted from the laser emission source 11 is separated into one main beam and two side beams. The main beam and the side beams are monitored by the light receiving element 14 through the beam splitter 13.

A collimator lens 15 and a mirror 16 adjacent to the collimator lens 15 are provided on the right side of the beam splitter 13 on the optical axis which extends from the beam splitter 13 as a starting point and is orthogonal to the optical axis of the laser emission source 11, and a concave lens 17 and a photodetecting section 70 adjacent to the concave lens 17 are provided on the left side of the beam splitter 13 on the optical axis which extends from the beam splitter 13 as a starting point and is orthogonal to the optical axis of the laser emission source 11. The laser beam L is polarized by 90 degree by the beam splitter 13, and is formed into a parallel luminous flux by the collimator lens 15, and is applied to the mirror 16. On the optical axis polarized by 90 degree by the mirror 16, a one fourth wave plate 18, and an objective lens 19 adjacent to the one fourth wave plate 18 are provided. The phase shift of the laser beam L is compensated by the one fourth wave plate 18, and thus-obtained laser beam L is applied to the pregrooves (i.e. recording tracks) of the optical disc 10 through the objective lens 19. The one fourth wave plate 18 may be omitted. The objective lens 19 has a numerical aperture NA which shows the performance of lens, as is the case of a microscope.

When the laser beam L is reflected by the optical disc 10, the return light L' thereof passes through the objective lens 19, the one fourth wave plate 18, the mirror 17, the collimator lens 15, the beam splitter 13, and the concave lens 17, and then is detected by the photodetecting section 70. The photodetecting section 70 has a four-split photodetector 701 and a two-split photodetectors 702 and 703 shown in FIG. 5. In the photodetecting section 70, when the recorded information is reproduced from the optical disc 10, as is conducted in a conventional method, the return light L' from the main spot 4 is split into four and is received while the pit 61 is read at the main spot 4 created by a three-beam method.

That is, in the photodetecting section 70, a light receiving signal A from the light receiving element PD1 such as a photodiode which constitutes a four split photodetector 701, and a light receiving signal D from the light receiving element PD4 similar to the light receiving element PD1 are added to each other to produce an addition signal A+D. At the same time, a light receiving signal B from the light receiving element PD2, and a light receiving signal C from the light receiving element PD3 are added to each other to produce an addition signal B+C. In the photodetecting section 70, the latter addition signal B+C is subtracted from the former addition signal A+D to obtain a wobble component.

In the above-described method, furthermore, the light receiving signals A to D from the four light receiving elements PD1 to PD4 in the photodetector 701 are also added to each other, and as a result, an RF signal (A+B+C+D) which is to be recorded information 15 obtained. At the same time, a tracking servo is controlled by use of a light receiving signal E from the light receiving element PD5, a light receiving signal F from the light receiving element PD6 of the two split photodetector 702, and a light receiving signal G from the light receiving element PD7, and a light receiving signal H from the light receiving element PD8 of the two split photodetector 703.

Figure 6A:
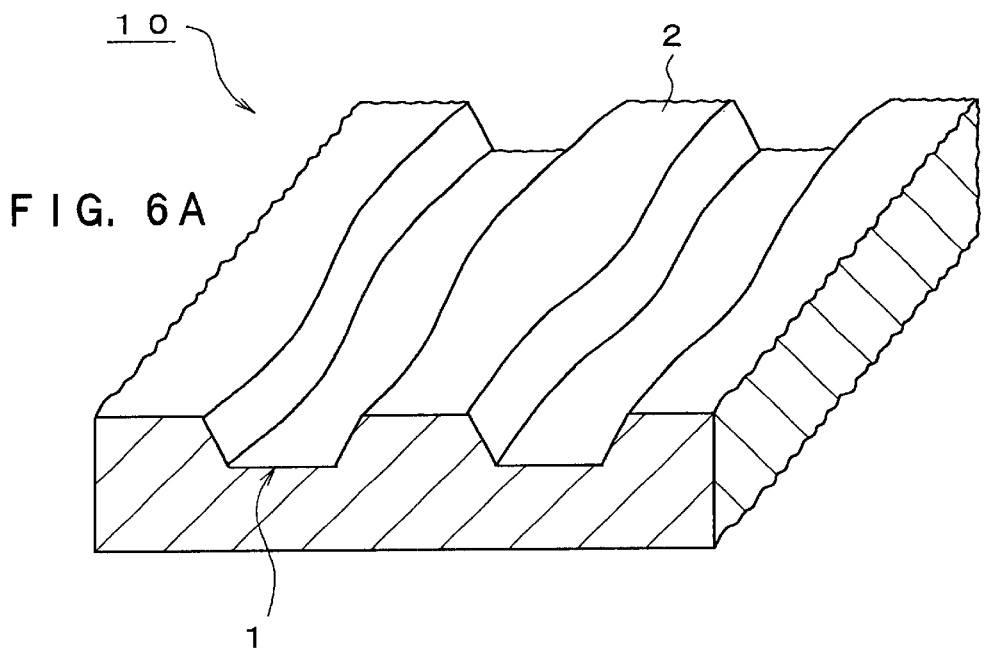
FIGS. 6A and 6B are diagrams respectively showing an exemplary structure of an optical disc 10 for which an optical pickup 30 is employed, and an example of the irradiation of three beams.

Next, an exemplary structure of the optical disc 10 to which the optical pickup 30 is applied, and an example of irradiation of three beams will be described. The optical disc 10 shown in FIG. 6A is a write once optical disc (CD-R, DVD-R), or a rewritable optical disc (CD-RW) and a mini-disc (MD). FIG. 6A is a diagram showing a portion of the optical disc 10 partially cut therefrom and enlarged. Herein, the portion between two adjacent pregrooves 1 is defined as a land 2. The disc 10 has pregrooves 1 which spirally extend from the inner peripheral section toward the outer peripheral section around an unillustrated hole for fastening the optical disc 10 as a center. When data (i.e. information) is recorded and reproduced, the laser beam L is induced along the pregrooves 1.

The pregrooves 1 are defined (i.e. partitioned) by the lands 2, and are slightly serpentine (i.e. wobbled) in the form of sine wave. Each pregroove 1 has a pigment layer to be a recording layer, and a reflection layer made of gold and the like is formed on the land 2 and the pregroove 1 so as to cover the pigment layer 12. The upper surface of the reflection layer is protected by a protective layer. In this manner, the optical disc 10 such as CD-R, DVD-R, CD-RW, and MD is constituted.

Figure 6B:
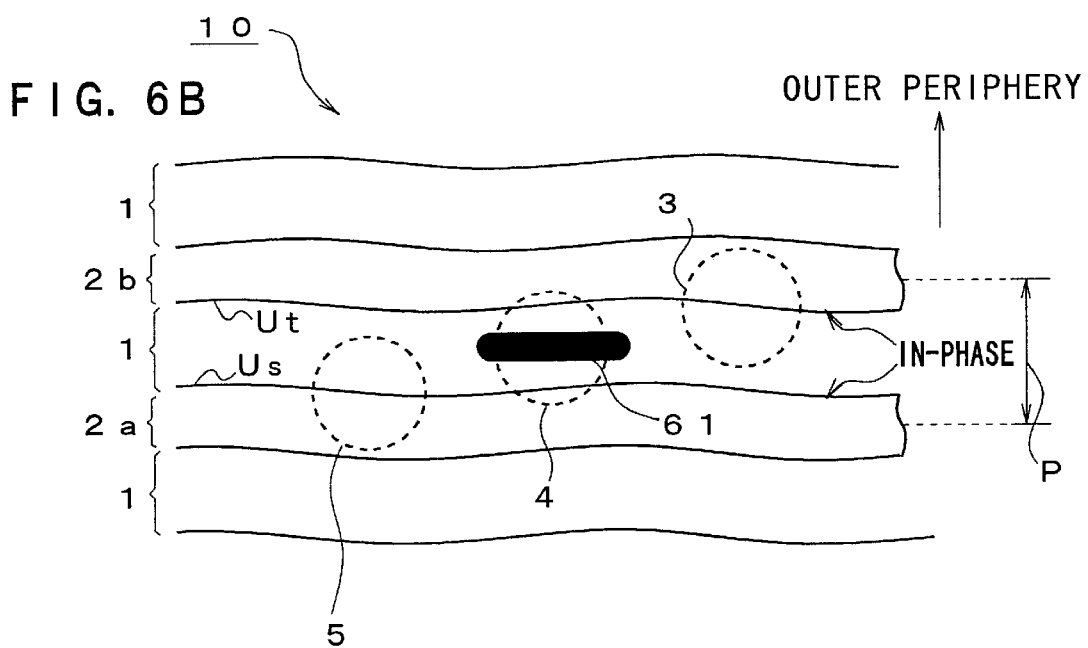

Each side surface of the pregroove 1, which coincides to each sloped surface of the land 2 shown in FIG. 6A, is formed with a slight wobble in the form of sine wave, as shown in an example of irradiation of three beams of FIG. 6B. The wobble component is based on the control signal for groove formation at the time of manufacturing the original disc for the optical disc 10, and has been subjected to FM modulation. The broken line circles in FIG. 6B shows spot diameters of the laser beam L, and indicate the case where the irradiation diameters thereof are relatively enlarged as the pregrooves are formed so as to be closer to each other in proportional to the increase in a storage density of the optical disc 10.

In the manufacturing the of the original disc for the optical disc 10, the pre-format addresses are subjected to baseband modulation in a modulation mode referred to as a bi-phase to produce a bi-phase signal DBP. Based on the bi-phase signal DBP, a control signal for groove formation is produced. Based on the control signal, a light beam with a predetermined intensity is caused to oscillate on the original disc in its inner and outer peripheral directions. At the same time, grooves are formed on the original disc in the state where the original disc is rotated at a predetermined linear velocity to define the pregrooves 1 and the land 2 on the original disc. As a result of these processes, in the original disc, pre-format addresses (hereinafter, also referred to as time axis information in some cases) are written, and a recommended value of the power of the laser beam optimum for recording is encoded. By use of thus-obtained original disc, the optical disc 10, so-called a blank disc, is produced.

The time axis information is constituted by at least synchronization information, minutes information, second information, frame information, and error correction information in one frame. Hereinafter, the time axis information for all frames is also referred to as ATIP (absolute time in pregroove) information in some cases. The ATIP information is written, for example, in the side surfaces Us and Ut of the pregroove 1 between two lands 2a and 2b shown in FIG. 6B, that is, in the side surface Us of the land 2a located at the inner peripheral side of the pregroove 1, and in the side surface Ut of the land 2b located at the outer peripheral side of the pregroove 1 in such a manner that the ATIP information written in the side surface Us is synchronous with the ATIP information written in the side surface Ut. Therefore, each ATIP information can be read as a wobble signal SWB by detecting the shape of the wobble formed in the lands 2a and 2b at a main spot 4.

The preceding side spot 3 is a light beam preceding a main spot 4 which is a laser beam L for recording and reading information. The wobble signal SWB is produced in such a manner that its center frequency becomes 22.05 kHz for example, when the disc is rotated at a standard velocity (CLV) of a compact disc (CD). One sector of the ATIP information is constituted in such a manner as to coincide to one data sector (2352 byte) after the signal is recorded. Therefore, at the time of recording information, data is written in the state where the sector of the ATIP information is synchronous with the data sector. For example, when a pre-format address is designated, the pregroove 1 is irradiated with a laser beam L with a predetermined intensity, and the information is written. An exemplary relationship between the ATIP information, the bi-phase signal DBP and the wobble signal SWB is described.

The ATIP information shown in FIG. 7A is subjected to bi-phase modulation, and is adjusted so that the logical levels "1" and "0" are exchanged with each other per a predetermined period, and also the average numbers of "1" and "0" become identical to each other. As a result of the bi-phase modulation, a bi-phase signal DBP shown in FIG. 7B is obtained. The bi-phase signal DBP is then subjected to FM modulation to be a wobble signal (i.e. a control signal for groove formation) SWB. That is, FM modulation is conducted in such a manner that, when the logical level of the bi-phase signal DBP is "1", the frequency is adjusted to 23.05 kHz, and when the logical level of the bi-phase signal DBP is "0", the frequency is adjusted to 21.05 kHz. As a result, the wobble signal SWB shown in FIG. 7C having a carrier signal which has been subjected to FM modulation in such a manner that its center frequency is 22.05 kHz as described above is produced.

Figure 8:
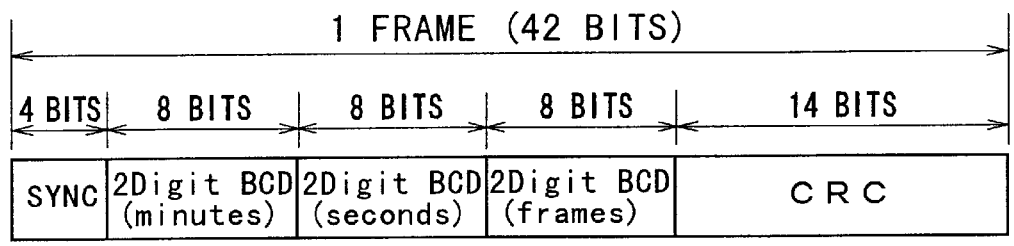
FIG. 8 is a diagram of data format showing an exemplary frame structure of ATIP information constituting pre-format addresses.

Hereinafter, an exemplary frame structure of the ATIP information constituting the pre-format addresses will be described. In the ATIP information shown in FIG. 8, the first four bits constitute synchronous information which is a synchronous signal SYNC. The next eight bits constitute minute information indicated by 2 digit BCD. The subsequent eight bits constitute second information indicated by 2 digit BCD. The further subsequent eight bits constitute frame information indicated by 2 digit BCD. The last 14 bits constitute error correction information indicated by cyclic redundancy code (CRC). The pre-format address in one frame is constituted by 42 bits. The information such as the recommended value of the power of the laser beam optimum for recording is recorded outside the data recording region by use of a part of the time axis information.

Next, an exemplary structure of an optical disc recording and reproducing apparatus 201 to which an optical pickup 30 is mounted according to a first example will be described.

Figure 9:
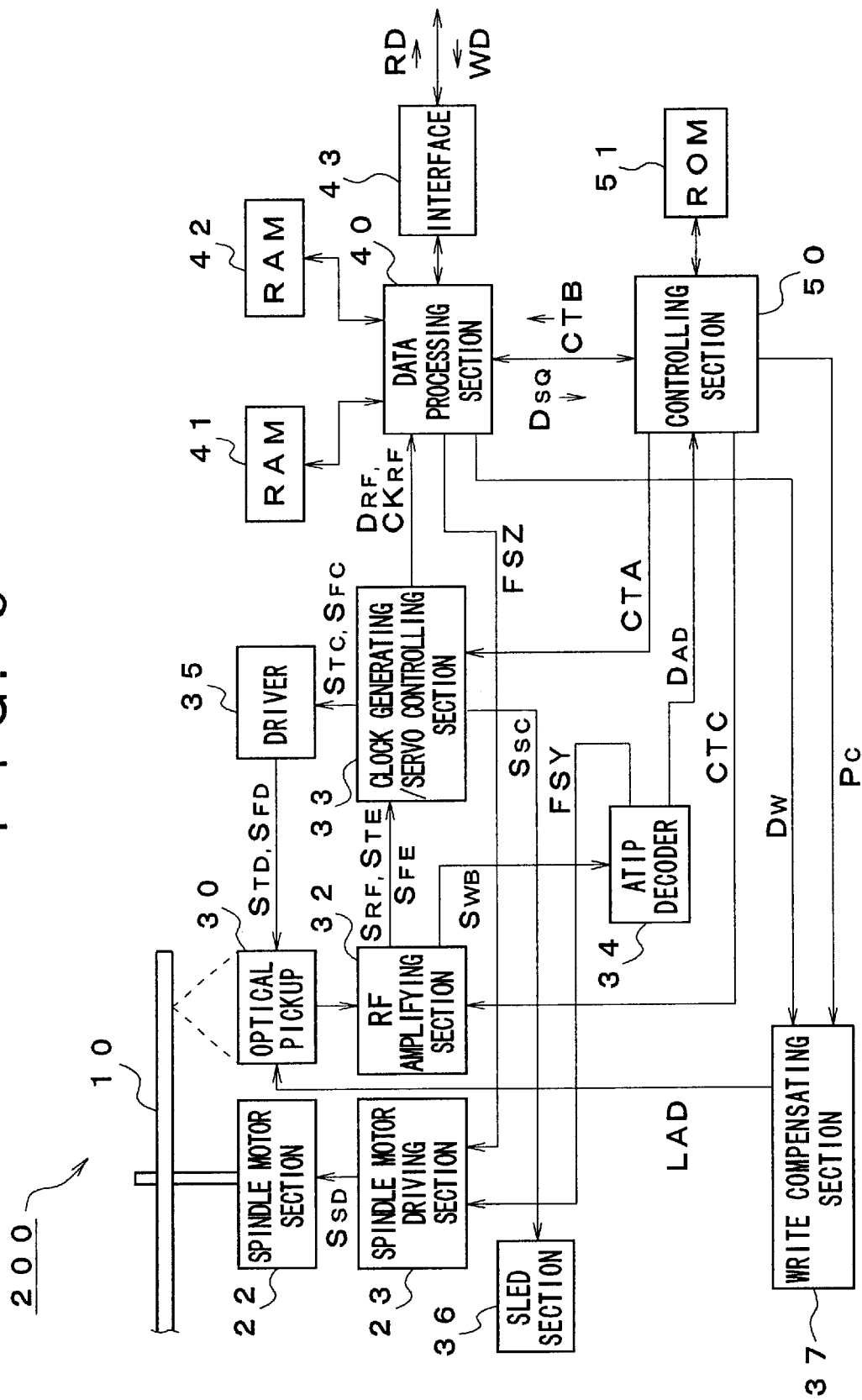
FIG. 9 is a block diagram showing an exemplary structure of an optical disc recording and reproducing apparatus 20 according to a first example to which an optical pickup 30 is mounted.

An optical disc recording and reproducing apparatus 201 shown in FIG. 9 has an optical pickup 30. The optical disc 10 is operated to rotate at a specified velocity by a spindle motor 22. The spindle motor 22 is driven so that it allows the optical disc 10 to rotate at a specified velocity by a spindle driving signal SSD provided from a spindle motor driving section 23 which will be described later.

The optical disc 10 is irradiated with a laser beam L of which amount of light is controlled by the optical pickup 30 in the optical disc recording and reproducing apparatus 201. The laser beam L is reflected by the optical disc 10, and then is detected by a photodetecting section 70 in the optical pickup 30 (see FIG. 4).

In the photodetecting section 70, the four-split photodetector 701 for detecting the return light L' of the main spot 4, such as that described above referring to FIG. 6B is used. When a DPP method is employed, the photodetecting section 70 constituted by, as shown in FIG. 5, an four-split photodetector 701, a two-split photodetector 702 for detecting a return light from the preceding side spot 3, a two-split photodetector 703 for detecting a return light L' of the posterior side spot 5 may be used. A voltage signal produced as a result of current-voltage conversion in each of the split photodetectors 701 to 703 is supplied to a RF amplifying section 32.

In the RF amplifying section 32, a tracking error signal STE is generated by a differential push-pull method capable of producing a tracking error signal containing almost no variation in direct current. In addition, a wobble signal SWB is produced by use of a push-pull signal obtained from the return light L' from the main spot 4.

Thus-produced RF signal SRF, the tracking error signal STE, and the focus error signal SFE produced in the RF amplifying section 32 are supplied to a clock generating/ servo controlling section 33 shown in FIG. 9. The wobble signal SWB is supplied to an ATIP decoder 34. An exemplary inner structure of the ATIP decoder 34 will be described later with reference to FIG. 10.

In the above-described clock generating/servo controlling section 33, a focus control signal SFC is generated based on the focus error signal SFE provided from the RF amplifying section 32. The focus control signal SFC is used for controlling the objective lens 19 of the optical pickup 30 to allow the laser beam L to be focused to a position in the recording layer of the optical disc 10 (see FIG. 4). Then, the focus control signal SFC is supplied to a driver 35. In addition, in the servo controlling section 33, a tracking control signal STC is generated based on the tracking error signal STE supplied from the RF amplifying section 32. The tracking control signal STC is used for controlling the objective lens 19 of the optical pickup 30 to allow the laser beam L to be applied to a center position in a desired track. Then, the tracking control signal STC is supplied to the driver 35.

In the driver 35, a focus driving signal SFD is produced based on the focus control signal SFC, and a tracking driving signal STD is produced based on the tracking control signal STC. The produced focus driving signal SFD and the tracking driving signal STD are supplied to an actuator (not shown) in the optical pickup 30, and as a result of this, the position of the objective lens 19 is controlled to allow the laser beam L to be focused to the center position in a desired track.

On the other hand, in the clock generating/servo controlling section 33, the RF signal supplied from the RF amplifying section 32 is asymmetrically corrected and binarized to be converted into a digital signal. The digital signal is supplied to a data processing section 40 as a data reading signal DRF. In addition, a clock signal CKRF synchronous with the above-described digital signal is produced. Thus-produced clock signal CKRF is supplied to the data processing section 40.

In addition, in the clock generating/servo controlling section 33, a sled control signal SSC for allowing the optical pickup 30 to move in a radial direction of the optical disc 10 is generated. The sled control signal SSC is supplied to a sled section 36. This process is conducted in order to prevent the laser beam L from being applied beyond the region determined by the tracking control. In the sled section 36, a sled motor is driven based on the sled control signal SSC to allow the optical pickup 30 to move in a radial direction of the optical disc 10.

A data processing section 40 is connected to the above-described clock generating/servo controlling section 33. The data reading signal DRF is EFM-demodulated, and an error correction is conducted in a RAM 41 by employing a deinterleave processing and a cross interleave reed-solomon code (CIRC). In addition, an error correction by employing a descramble processing and an error correction code (ECC) is also conducted. The data signal obtained after the error correction is stored in a RAM 42 as a buffer memory, and then is supplied as a reproducing data signal RD to an external computer through an interface 43.

In the data processing section 40, a frame synchronization signal FSZ is detected from the data signal obtained after EFM demodulation detected. The detected frame synchronization signal FSZ is supplied to the spindle motor driving section 23. In the spindle motor driving section 23, the ATIP synchronization detecting signal FSY from the ATIP decoder 34 is used when a signal is recorded in the optical disc 10. Contrary to this, the frame synchronization signal FSZ from the data processing section 40 or the ATIP synchronization detecting signal FSY from the ATIP decoder 34 is used when information is read from the optical disc 10. As a result, a spindle driving signal SSD for operating the optical disc 10 to rotate at a desired velocity is produced. By supplying the spindle driving signal SSD produced in the spindle motor driving section 23 to the spindle motor section 22, the optical disc 10 is operated to rotate at a desired velocity.

Furthermore, in the data processing section 40, when a data recording signal WD is supplied from an external computer through the interface 43, the data recording signal WD is temporality stored in a RAM 42. At the same time, the data recording signal WD stored in the RAM 42 is encoded into a predetermined sector format, and additional processing is conducted to an error correcting code (ECC) for error correction. In addition, in the data processing section 40, a CIRC encoding and an EFM modulation are also conducted to produce a write signal DW. Thus-produced writing signal DW is supplied to a write compensating section 37.

In the write compensating section 37, a laser driving signal LAD is produced based on the write signal DW supplied from the data processing section 40. The laser driving signal LAD is supplied to the laser emission source (i.e. a laser diode) 11 in the optical pickup 30. Here, in the write compensating section 37, a signal level of the laser driving signal LAD is corrected based on a power compensating signal PC from a controlling section 50 which will be described later in accordance with the characteristics of the recording layer of the optical disc 10, the shape of the spot of the laser beam L, the linear velocity at which the recording is conducted, and the like. Then, the power of the laser beam L emitted from the laser emission source 11 in the optical pickup 30 is optimized to record the signal.

A ROM 51 is connected to the controlling section 50 described above. The ROM 51 controls the operation of the optical disc recording and reproducing apparatus 201 based on the program for operation control stored in the ROM 51. For example, the controlling section 50 judges the position where the reproduction is conducted and the position where the recording is conducted based on a subcode signal DSQ produced in the data processing section 40 and the pre-format address DAD from the decoder 34. Then, the controlling section 50 supplies a control signal CTA to the clock generating/servo controlling section 33, a control signal CTB to the data processing section 40, and the like to conduct a data recording and reproducing operation.

Furthermore, the controlling section 50 produces a power compensating signal PC based on the information for setting the recording laser power shown by the pre-format address DAD, and supplies the power compensating signal PC to the write compensating section 37. In addition to the this process, a control signal CTC is supplied from the controlling section 50 to the RF amplifying section 32. The RF amplifying section 32 conducts an on-off control for the laser emission source 11 in the optical pickup 30, and superimposes a high frequency onto the laser beam L in order to reduce a laser noise and a disturbance to the RF signal.

Next, an exemplary structure of an ATIP decoder 34 to which the wobble signal SWB is supplied will be described. The ATIP decoder 34 shown in FIG. 10 constitutes an operation device 7, and is constituted by a digital signal processor (DSP) unit.

The ATIP decoder 34 has a bandpass filter 341, an analog/digital conversion circuit (hereinafter, referred to as an A/D conversion circuit) 342, a read information memory 343, a subtraction circuits 344, 352 and 353, a binary circuit 345, PLL circuits, 336 and 347, a bi-phase decoder 348, MSF conversion circuit 349, and an encoder 351.

The wobble signal SWB is supplied to the bandpass filter 341 in the ATIP decoder 34, and its band is limited so that the wobble component (A+D)−(B+C) read by the main spot 4 is taken out. The A/D conversion circuit 342 is connected to the bandpass filter 341. In the A/D conversion circuit 342, the wobble signal SWB after its band is limited as described above is subjected to analog-digital conversion. The wobble information after the A/D conversion (hereinafter, referred to as read information) Z0 is temporality stored in the read information memory 343. An operation circuit 344 for subtracting crosstalk is connected to the read information memory 343. In the operation circuit 344, the synthetic interference information (i.e. crosstalk information) y generated by the pre-format addresses adjacent to the target pre-format address is subtracted from the read information Z0 of the target pre-format address. The information Z0−y after the subtraction becomes recorded information Z1.

The binary circuit 345 is connected to the operation circuit 344. In the binary circuit 345, the recorded information Z1 is binarized. The PLL circuit 346 is connected to the binary circuit 345. In the PLL circuit 346, the phase loop of the recorded information Z1 synchronous with the carrier component at 22.05 kHz is stabilized. Furthermore, the PLL circuit 347 for generating clock is connected to the PLL circuit 346. In the PLL circuit 347 for generating clock, a clock signal (FMCK) CKWB synchronous with the carrier component is produced from the recorded information Z1.

The bi-phase decoder 348 is connected to the above-described two PLL circuits 346 and 347. In the bi-phase decoder 348, the recorded information Z1 synchronous with the carrier component of the clock signal CKWB produced beforehand is demodulated based on the clock signal CKWB to produce a bi-phase signal DPB. The MSF conversion circuit 349 is connected to the bi-phase decoder 348. In the MSF conversion circuit 349, the bi-phase signal DBP after the demodulation is converted into a pre-format address DAD. In addition, in the MSF conversion circuit 349, the synchronization pattern of the pre-format address DAD is detected to produce an ATIP synchronization detecting signal FSY. The ATIP synchronization detecting signal FSY is supplied to a spindle motor driving section 23.

In addition, the encoder 351 and the above-described controlling section 50 are connected to the MSF conversion circuit 349. The pre-format address DAD at the reading position in the main spot 4 is supplied to each of the encoder 351 and the controlling section 50. In the encoder 351, the pre-format address adjacent to the target pre-format address DAD at its inner and outer peripheral sides are encoded.

For example, defining a standard radius of the optical disc as r0, a track pitch as tp, and a standard linear velocity as v, a sector frequency as f, and a sector number as Nts in the format of CD at a standard linear velocity (CLV), the radius position r indicating the pre-format address at an arbitrary reading position is operated by the following Formula (1):

$$r=1/2[\sqrt{\{tp+2\cdot r0)^2+4\cdot tp\cdot v\cdot Nts/(\pi\cdot f)\}}-tp+2\cdot r0)] \quad (1)$$

On the other hand, defining the sector frequency as fHz when the sector number Nts is the number of subframes counted from 00 minutes and 02 seconds and 00 frame, and the main spot 4 is positioned at the top end of M minutes S seconds F frame, the sector number Nts is operated by the following Formula (2):

$$Nts=60 \cdot f \cdot M + f \cdot S + f \cdot F - 2 \cdot f \quad (2)$$

The sector number Nr on one rotation of the optical disc 10 is operated by the following Formula (3):

$$Nr = 2 \cdot \pi \cdot r / (v \cdot f) \quad (3)$$

The operation circuit 352 for calculating crosstalk is connected to the above-described encoder 351. In the operation circuit 352, the interference information ya generated by the pre-format address in the pregroove at the inner peripheral side is operated. At the same time, the interference information yb by the pre-format address in the pre-groove at the outer peripheral side is operated.

For example, as to the interference information ya generated by the pre-format address in the pregroove at the inner peripheral side is regarded as having the shape of a sine wave, defining the amplitude thereof as A, the phase differences as $\phi a0$ and $\phi a1$, and the angular rate as $\omega a1$, the interference information ya is operated by the following Formula (4):

$$ya = A \cdot \sin(\phi a0 + \phi a1 + \omega a1 \cdot t) \quad (4)$$

Similarly, as to the interference information yb generated by the pre-format address in the pregroove at the outer peripheral side, defining the amplitude thereof as B, the phase differences as $\phi b0$ and $\phi b1$, and the angular rate as $\omega b1$, the interference information yb is operated by the following Formula (5):

$$yb = B \cdot \sin(\phi b0 + \phi b1 + \omega b1 \cdot t) \quad (5)$$

The operation circuit 353 for calculating synthetic interference information is connected to the operation circuit 352. Based on the control command START=1 or 0 from the above-described controlling section 50, the operation circuit 353 is controlled to output the synthetic interference information y to the above-described operation circuit 344 for subtracting crosstalk. In this example, when the control command START=1 is provided, y=ya+yb is output to the operation circuit 344. When the control command START=0 is provided, y=0 is output to the operation circuit 344. As a result, in the operation circuit 344, Z1=Z0−(ya+yb) is operated based on the control command START=1. Contrary to this, Z1=Z0 is output based on the control command START=0.

When the wobble signal SWB has a single carrier as is the case of DVD-R, the interference information y0 is operated at a position where the main spot 4 exists. For example, when the interference information y0 generated by the pre-format address in the target pregroove is regarded as having the shape of a sine wave, and defining the amplitude thereof as G0, the phase difference as $\phi 0$, and the angular rate as $\omega 0$, the interference information y0 is operated by the following Formula (6):

$$Y0 = G0 \cdot \sin(\phi 0 + \omega 0 \cdot t) \quad (6)$$

As to interference information ya generated by the pre-format address in the pregroove at the inner peripheral side, defining the amplitude thereof as A, the interference information ya is operated by the following Formula (7):

$$ya = A \cdot \sin\{\phi a0 + \phi 0 + 2 \cdot \pi \cdot (r/v) \cdot \omega 0 + \omega 0 \cdot t\} \quad (7)$$

Similarly, as to the interference information yb generated by the pre-format address in the pregroove at the outer peripheral side, defining the amplitude thereof as B, the interference information yb is operated by the following Formula (8):

$$yb = B \cdot \sin\{\phi b0 + 2 \cdot \pi \cdot (r/v) \cdot \omega 0 + \omega 0 \cdot t\} \quad (8)$$

Next, an exemplary action of an optical disc recording and reproducing apparatus 201 according to a first example will be described. FIGS. 11A to 11C are wave form diagrams each showing an exemplary calculation to obtain a phase of a wobble signal SWB at a current position. FIGS. 12A and 12B are diagrams each showing an exemplary waveform of a bi-phase signal DBP for pre-format addresses at inner and outer peripheral sides.

For example, when the phase of the wobble signal SWB having a single carrier at a current position is calculated, the zero intersection of the sine wave of the output (A+D)−(B+C) from the bandpass filter 341 is detected by use of an unillustrated comparator and the like.

The binary data (corresponding to the bi-phase signal DBP) generated by the comparators is compared with a reference signal such as a window signal SW of a constant period (1/f0) shown in FIG. 11C, and it is judged whether or not the rising edges of the output from the comparator are successively synchronized with the period of high-level of the window signal. f0 is a frequency of 22.05 kHz±1 kHz of the wobble signal, and the angular rate $\omega 0$ is $2\pi f0$. The width of the window signal is about (1/f0)±10%.

When it is detected that the rising edges of the output from the comparator are at an identical time interval to each other, the timer (i.e. time) is started from this point of time as t=0, and the elapsed time tx is calculated. Based on the elapsed time tx and the control command START=1, Z1=Z0−(ya+yb) is operated. Based on the control command START=0, Z1=Z0 is output.

In this example, the description is made on an assumption that the optical disc 10 is mounted to the optical disc recording and reproducing apparatus 201. In addition, it is assumed that information is read from the optical disc 10 into which the information has been recorded beforehand based on the pre-format addresses. The flow chart according to the method for obtaining the information which has been described above with reference to FIG. 3 is used again.

A. At the Time when Information is Recorded in the Optical Disc 10

In this case, in Step A1 of the flow chart according to the method for obtaining information described above with reference to FIG. 3, the optical disc 10 is irradiated with the laser beam L. The return light L' from the optical disc 10 is detected by the optical pickup 30. As a result, the target pre-format address and the recorded information (i.e. read information Z0) are obtained. At this time, the shape of wobble is read by use of the main spot 4 shown in FIG. 6B to produce a wobble signal SWB.

The wobble signal SWB contains a wobble component (A+D)−(B+C) detected by the four light receiving elements PD1 to PD4 in the four-split photodetector 701. The wobble signal SWB is amplified by the RF amplifying section 32, and after that, is output to the bandpass filter 341 in the ATIP decoder 34. In the bandpass filter 341, the band of the wobble signal SWB is limited so that the wobble component (A+D)−(B+C) read by the main spot 4 is taken out. After the band limitation, the wobble signal SWB is subjected to analog-digital conversion by the A/D conversion circuit 342 to produce read information Z0. The read information after the A/D conversion is temporality stored in the read information memory 343.

In Step A2, in the ATIP decoder 34, the pre-format addresses adjacent to the target pre-format address at its inner and outer peripheral sides is operated. At this time, as to the read information Z0 of the target pre-format address read from the read information memory 343, the control command START=0 is output from the controlling section 50 to the operation circuit 353 for calculating synthetic interference information. Therefore, y=0 is output from the operation circuit 353 to the operation circuit 344 for subtracting crosstalk. As a result, in the operation circuit 344, Z0−0 is operated. The information Z0 after the operation becomes recorded information Z1, and is output to the binary circuit 345.

In the binary circuit 345, the recorded information Z1 is binarized, and after that, the phase loop of the recorded information Z1 synchronous with the carrier component of 22.05 kHz is stabilized in the PLL circuit 346. Furthermore, in the PLL circuit 347 for generating clock connected to the PLL circuit 346, a clock signal (FMCK) CKWB synchronous with the carrier component is produced from the recorded information Z1. Based on the clock signal CKWB, the recorded information Z1 synchronous with the carrier component of the clock signal CKWB is demodulated to produce a bi-phase signal DBP.

After the demodulation, the bi-phase signal DBP is converted into a pre-format address DAD indicating the reading position in the main spot 4 by the MSF conversion circuit 349. In the MSF conversion circuit 349, the synchronization pattern of the pre-format address DAD is detected to produce an ATIP synchronization detecting signal FSY. The ATIP synchronization detecting signal FSY is supplied to the spindle motor driving section 23.

The pre-format address DAD at the reading position in the main spot 4 is supplied from the MSF conversion circuit 349 to each of the encoder 351 and the controlling section 50. In this example, the pre-format addresses adjacent to the target pre-format address DAD at its inner and outer peripheral sides are encoded by the encoder 351.

For example, it is assumed that the main spot 4 is positioned at a top end of 30 minutes and 00 second and 00 frame in which the current pre-format address exists. Defining a standard radius of the optical disc as r0=25 mm, a track pitch as tp=1.6 μm, and a standard linear velocity as v=1.3 m/s, a sector frequency as f=75 Hz, and a sector number as Nts in the format of CD at a standard linear velocity (CLV), the pre-format addresses in the pre-grooves adjacent to the pre-format address r in 30 minutes 00 and seconds and 00 frame at its inner and outer peripheral sides are operated by Formula (1) to (3).

First, the sector number Nts which is the number of subframes counted from 00 minute and 02 seconds and 00 frame is operated by Formula (2). As a result of the operation, the sector number Nts is obtained as follows:

$$Nts=60\cdot75\cdot30+75\cdot00+75\cdot00-75\cdot2=134850$$

The radius position r for the pre-format address, which is a current reading position, is obtained by Formula (1) as follows:

$$r=1/2[\sqrt{\{(0.0016+2\cdot25)^2+4\cdot0.016\cdot1300\cdot134850/(\pi\cdot75)\}}-(0.0016+2\cdot25)]=42.60752138 \text{ mm}.$$

Furthermore, the sector number Nr on one rotation of the optical disc 10 is obtained by Formula (3) as follows:

$$Nr=2\cdot\pi\cdot42.60752138/(1300/75)=15.44486$$

As a result, the pre-format address in the pregroove adjacent to the target pre-format address (in 30 minutes and 00 second and 00 frame) at its inner peripheral side is in 29 minutes and 59 seconds and 59.56 frame. The pre-format address in the pregroove adjacent to the target pre-format address at its outer peripheral side is in 30 minutes and 00 second and 15.44 frame.

Figure 3:
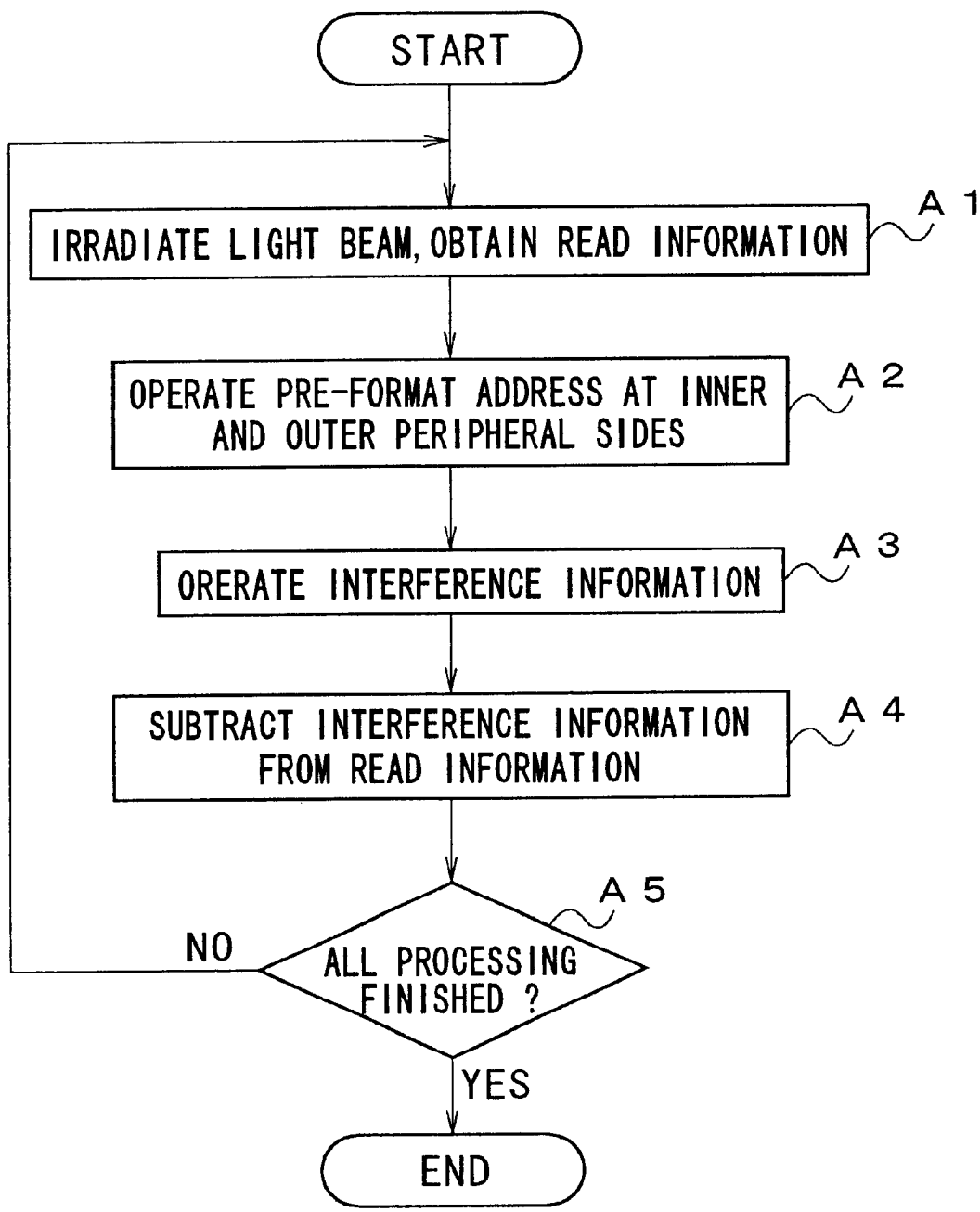
FIG. 3 is a flow chart showing an exemplary processing by a method for reading information according to an embodiment of the present invention.

In this example, in Step A3 in the flow chart shown in FIG. 3, the interference information ya and yb generated by the pre-format addresses adjacent to the target pre-format address at its inner and outer peripheral sides are respectively operated. FIG. 12A shows the bi-phase signal DBP for the pre-format address (in 29 minutes and 59 seconds and 59.56 frame) in the pregroove at the inner peripheral side. The interference information ya after the elapse of time tx1 from the point of time t=0 shown in FIG. 12A is operated by the operation circuit 352 for calculating crosstalk.

FIG. 12B shows the bi-phase signal DBP for the pre-format address (in 30 minutes and 00 second and 15.44 frame) in the pregroove at the outer peripheral side. In this example, the interference information yb after the elapse of time tx2 from the point of time t=0 is operated as is conducted for operating the interference information ya.

For example, the interference information ya generated by the pre-format address in the pregroove at the inner peripheral side at a frequency of 22.05 kHz±1 kHz is operated by the above-mentioned Formula (4). In this operation, the amplitude thereof is defined as A, and the phase difference $\phi a0$ is defined as 0[rad] initially. The elapsed time tx11 is set to 139.68 μs which is obtained at a frequency of 23.05 kHz by the following formula. The phase in the time range of $0 \leq t \leq 1139.68$ μs is set, and the elapsed time tx12 is set to 158.73 μs which is obtained at a frequency 21.05 kHz in the same manner as is the case of the elapsed time tx11. In addition, the phase in the time range of $139.68 \mu s \leq t \leq 139.68 \mu s + 158.73 \mu s$ is used in the operation.

Here, the elapsed time tx11 at a frequency of 23.05 kHz is operated as follows:

$$tx11=[\{1/(r\cdot f)\}\cdot(1-\text{fraction of frame})]\cdot10^{-6}$$

In this example, the elapsed time tx11 at a frequency of 23.05 kHz is obtained as follows:

$$tx11=[\{1/(42\cdot75)\}\cdot(1-0.56)]\cdot10^{-6}=139.68 \mu s$$

The elapsed time tx12 at a frequency of 21.05 kHz is obtained as follows:

$$tx12=[\{1/(r\cdot f)\}/2]\cdot10^{-6}$$

In this example, the elapsed time tx12 at a frequency of 21.05 kHz is obtained as follows:

$$tx12=[\{1/(42\cdot75)\}/2]\cdot10^{-6}=158.73 \mu s$$

[1] The phase $\phi a1$ in the time range of $0 \leq t \leq 139.68$ μs at a frequency of 23.05 kHz is obtained as follows, defining the angular rate as $\omega a1$:

$$\phi a1=[1/\{r\cdot f\cdot(\text{fraction of frame})\}]\cdot\omega a1[\text{rad}]$$

In this example, the phase $\phi a1$ is obtained as follows:

$$\phi a1=[1/\{42\cdot75\cdot0.56\}]\cdot\omega a1$$

Here, the angular rate $\omega a1$ is:

$$\omega a1=2\cdot\pi\cdot f0\cdot10^{-3}[\text{rad/s}]$$

and therefore, $$\omega a1=2\cdot\pi\cdot23\cdot05\cdot10^{-3}[\text{rad/s}]$$

[2] The phase φa1 in the time range of 139.68 µs≦t≦1139.68 µs+158.73 µs at a frequency of 21.05 kHz is obtained as follows:

$$\phi a1=[1/\{r\cdot f\cdot 1.0\}]\cdot \omega a1[\text{rad}]$$

In this example, the phase φa1 is obtained as follows:

$$\phi a1=[1/\{42\cdot 75\cdot 1.0\}]\cdot \omega a1$$

Here, the angular rate ωa1 is:

$$\omega a1=2\cdot \pi \cdot 21.05\cdot 10^{-3}[\text{rad}/s]$$

In the operation circuit 352, after the phases φa1 are calculated by Formula [1] and [2], the interference information ya is operated by Formula (4).

The interference information yb by the pre-format address in the pregroove at the outer peripheral side at a frequency of 22.05 kHz±1 kHz is operated by the above-mentioned Formula (5). In this operation, the amplitude thereof is defined as B, and the phase difference φa0 is defined as 0[rad] initially. The elapsed time tx21 is set to 177.77 µs which is obtained at a frequency of 23.05 kHz by the following formula. The phase in the time range of 0≦t≦177.77 µs is set, and the elapsed time tx22 is set to 317.46 µs which is obtained at a frequency 21.05 kHz in the same manner as is the case of the elapsed time tx21. In addition, the phase in the time range of 177.77 µs≦t≦177.771 µs+317.46s is used in the operation.

Here, the elapsed time tx21 at a frequency of 23.05 kHz is operated as follows:

$$tx21=[\{1/(42\cdot 75)\}\cdot (1-0.44)]\cdot 10^{-6}=177.77\ \mu s$$

In addition, the elapsed time tx22 at a frequency of 21.05 kHz is obtained as follows:

$$tx22=[1/(r\cdot f)/]\cdot 10^{-6}$$

In this example, the elapsed time tx22 at a frequency of 21.05 kHz is obtained as follows:

$$tx22=[1/(42\cdot 75)/2]\cdot 10^{-6}=317.46\ \mu s$$

[3] The phase φa1 in the time range of 0≦t≦177.77 µs at a frequency of 23.05 kHz is obtained as follows, defining the angular rate as ωa1:

$$\phi a1=[1/(42\cdot 75\cdot 0.44)]\cdot \omega a1$$

Here, the angular rate ωa1 is:

$$\omega a1=2\cdot \pi \cdot 23.05\cdot 10^{-3}[\text{rad}/s]$$

[4] The phase φa1 in the time range of 177.77≦t≦177.77 µs +317.46 µs at a frequency of 21.05 kHz is obtained as follows:

$$\phi a1=[1/(r\cdot f\cdot 1.0)]\cdot \omega a1[\text{rad}]$$

In this example, the phase φa1 is obtained as follows:

$$\phi a1=[1/42\cdot 75\cdot 1.0]\cdot \omega a1$$

Here, the angular rate ωa1 is:

$$\omega a1=2\cdot \pi \cdot 21.05\cdot 10^{-3}[\text{rad}/s]$$

In the operation circuit 352, after the phases φa1 are calculated by Formula [3] and [4], the interference information yb is operated by Formula (5).

In Step A4 in the flow chart shown in FIG. 3, based on the control command START=1 which is output from the controlling section 50 to the operation circuit 353 for calculating the synthetic interference information, the interference information y is subtracted from the read information Z0 of the target pre-format address. For example, when receiving the control command START=1 from the controlling section 50, y=ya+yb is operated in the operation circuit 353 based on the control command START=1. The result of the operation is output from the operation circuit 353 to the operation circuit 344. In the operation circuit 344, Z1=Z0−(ya+yb) is operated based on the control command START=1. The information Z0−y after the operation becomes recorded information Z1, and is output to the binary circuit 346.

In the binary circuit 345, the recorded information Z1 is binarized. After that, as described above, the DSP processing is repeated by the PLL circuits 346 and 347, the bi-phase decoder 348, and the MSF conversion circuit 349. In Step A5, the operation circuit 353 judges, based on the control command START supplied from the controlling section 50, whether or not the processing of reading information has been finished. If no command for finishing the information reading is received, the procedure returns to Step A1, and the processing of reading information is continued. When the command for finishing the processing is provided from the controlling section 50, the processing of reading information is finished.

Based on the wobble signal SWB, the optical disc 10 is controlled to rotate at a specified velocity, while the pre-format address in the track where the main spot 4 is positioned is clarified. Based on the result of the clarification of the address, the irradiation position of the laser beam L is controlled so that the main spot 4 falls on a desired track. When the main spot 4 falls on a desired track, the data is written into the optical disc 10.

B. At the Time when the Information is Reproduced from the Optical Disc 10

At this time, the optical disc 10 is irradiated with the laser beam L based on the pre-format addresses, and the return light L' reflected by the optical disc 10 is detected by the optical pickup 30. In the process of reproducing the information, when the time axis information is read based on the wobble signal SWB, the interference information y is subtracted from the read information Z0 of the target pre-format address. Therefore, only the information Z1 recorded in the target pre-format address can be taken out from the read information Z0 read from the optical disc 10. In this manner, even if the light beam is applied across the adjacent information recording layers in accordance with the increase in a storage density of the optical disc, the occurrence of crosstalk can be prevented.

(3) Second Example

Figure 13:
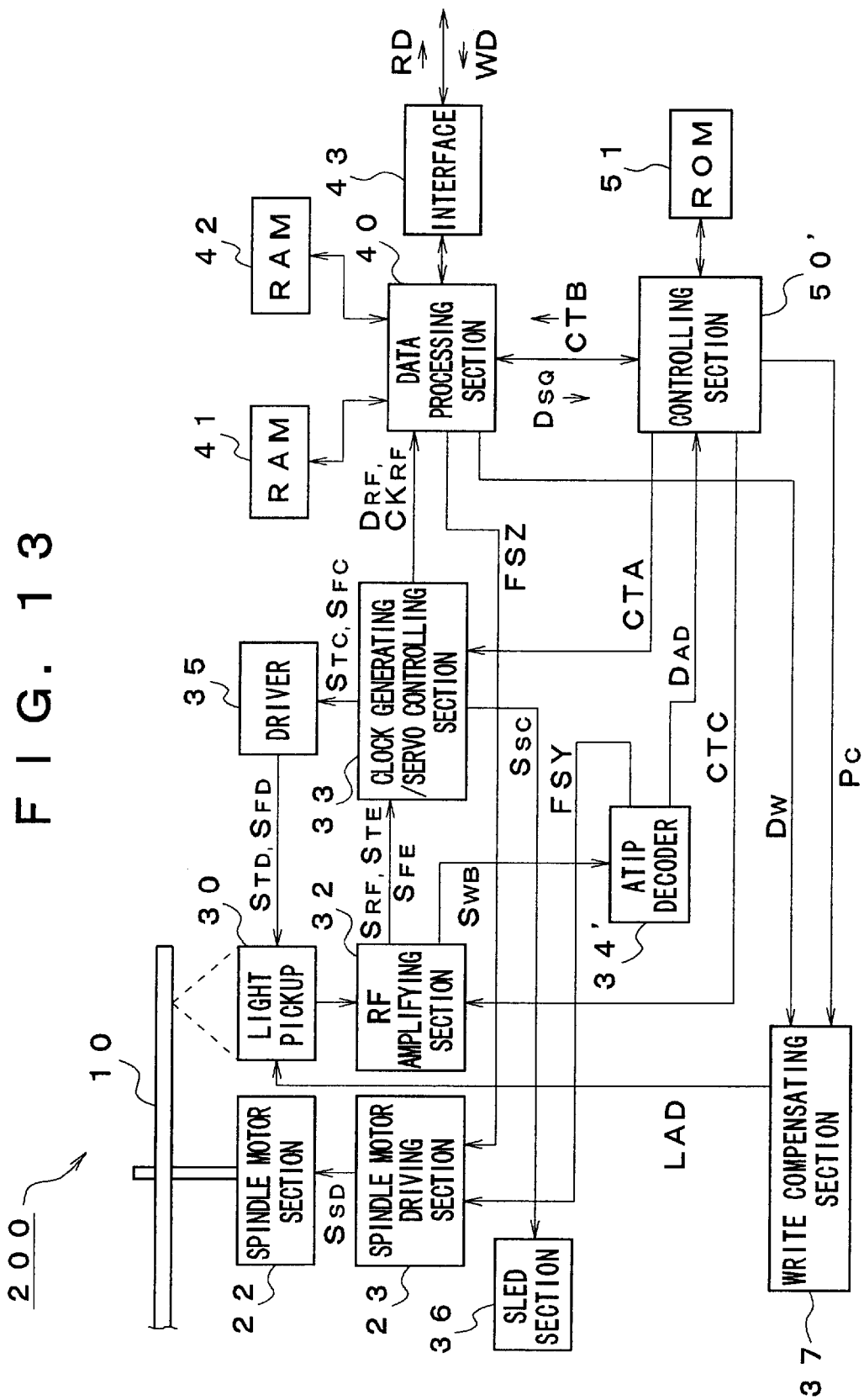
FIG. 13 is a block diagram showing an exemplary structure of an optical disc recording and reproducing apparatus 202 according to a second example.

FIG. 13 is a block diagram showing an exemplary structure of an optical disc recording and reproducing apparatus 202 according to a second example. In this example, instead of the ATIP decoder 34 having a DSP structure, an ATIP decoder 34' and a controlling section 50' are provided. The ATIP decoder 34' and the controlling section 50' are used to conduct analog processing for the wobble signal SWB, so as to remove the crosstalk generated by the pre-format addresses in the pregrooves adjacent to each other. In this example, the encoding function of the ATIP decoder 34 is employed. In addition, the data processing function of the controlling section 50' is employed for operating the interference information y.

The optical disc recording and reproducing apparatus 202 shown in FIG. 13 is different from the optical disc recording and reproducing apparatus 201 described in the first example in that the ATIP decoder 34' and the controlling section 50' are provided, instead of the ATIP decoder 34 and the controlling section 50. The constituent elements having the same names and reference numerals as those of the first example have the same functions, and therefore, their description will be omitted.

Figure 14:
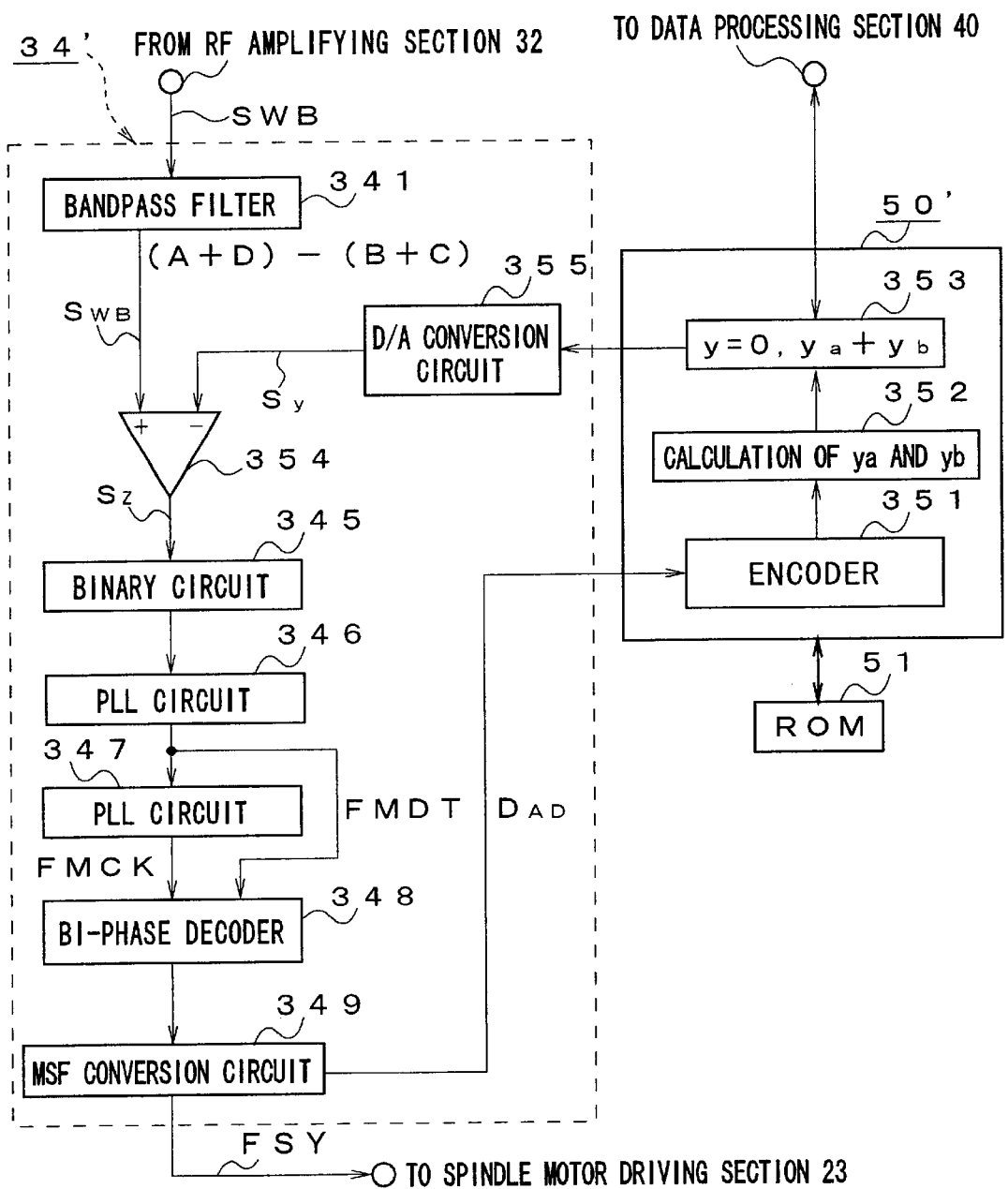
FIG. 14 is a block diagram showing an exemplary inner structure of an ATIP decoder 34' as an operation device and a controlling section 50'.

FIG. 14 is a block diagram showing an exemplary inner structure of the ATIP decoder 34' and the controlling section 50'.

The ATIP decoder 34' has a bandpass filter 341, an analog/digital conversion circuit (hereinafter, referred to as an A/D conversion circuit) 355, a subtraction circuit 354, a binary circuit 345, PLL circuits, 346 and 347, a bi-phase decoder 348, and an MSF conversion circuit 349.

The wobble signal SWB is supplied to the bandpass filter 341 in the ATIP decoder 34', and its band is limited so that the wobble component (A+D)–(B+C) read by the main spot 4 is taken out. The subtraction circuit 354 is connected to the bandpass filter 341. In the bandpass filter 341, an analog signal Sy for the synthetic interference information (i.e. crosstalk information) y generated by the pre-format addresses adjacent to the target pre-format information is subtracted from the wobble signal SWB after its band is limited. The analog output signal SWB–Sy after the subtraction becomes recorded information Sz.

The binary circuit 345 is connected to the subtraction circuit 354. In the binary circuit 345, the recorded signal Z2 is binarized. The recorded signal Sz after the binarization becomes recorded information Z1. As is the case of the first example, the PLL circuit 346 is connected to the binary circuit 345. In the PLL circuit 346, the phase loop of the recorded information Z1 synchronous with the carrier component at 22.05 kHz is stabilized. Furthermore, the PLL circuit 347 for generating clock is connected to the PLL circuit 346. In the PLL circuit 347 for generating clock, a clock signal (FMCK) CKWB synchronous with the carrier component is produced from the recorded information Z1.

The bi-phase decoder 348 is connected to the above-described two PLL circuits 346 and 347. In the bi-phase decoder 348, the recorded information Z1 synchronous with the carrier component of the clock signal CKWB produced beforehand is demodulated based on the clock signal CKWB to produce a bi-phase signal DPB. The MSF conversion circuit 349 is connected to the bi-phase decoder 348. In the MSF conversion circuit 349, the bi-phase signal DBP after the demodulation is converted into a pre-format address DAD. The pre-format address DAD is output to the controlling section 50'. In addition, in the MSF conversion circuit 349, the synchronization pattern of the pre-format address DAD is detected to produce an ATIP synchronization detecting signal FSY. The ATIP synchronization detecting signal FSY is supplied to a spindle motor driving section 23.

The controlling section 50' is connected to the MSF conversion circuit 349. The controlling section 50' has the encoder 351, the operation circuit 352 for calculating crosstalk, and the operation circuit 353 for calculating synthetic interference information, which have been described above in the first example. Obviously, the encoder 351, and the operation circuits 352 and 353 may have the same operation function as that of the controlling section 50 of the first embodiment.

In the encoder 351 in the controlling section 50', the pre-format addresses in the pregroove adjacent to the target pre-format address DAD at its inner and outer peripheral sides are encoded. For example, the radius position r indicating the pre-format address which is an arbitrary reading position is operated by Formula (1), as has been described in the first example. The sector number Nts at this time is operated by Formula (2). The sector number Nr on one rotation of the optical disc 10 is operated by Formula (3).

The operation circuit 352 for calculating crosstalk is connected to the encoder 351. In the operation circuit 352, the interference information ya by the pre-format address in the pregroove at the inner peripheral side is operated by Formula (4). At the same time, the interference information yb by the pre-format address in the pregroove at the outer peripheral side is operated by Formula (5).

The operation circuit 353 for calculating synthetic interference information is connected to the operation circuit 352. The operation circuit 353 is controlled to output the synthetic interference information y to the D/A conversion circuit 355 described above, based on the control command START=1 or 0 generated in the controlling section 50'. In this example, y=ya+yb is output to the D/A conversion circuit 355 when the control command START=1 is provided from the controlling section 50'. Contrary to this, y=0 is output to the D/A conversion circuit 355 when the control command START=0 is provided from the controlling section 50'. As a result, in the subtraction circuit 354, the analog signal Sy obtained by conducting digital-analog conversion to the interference information y is output to the subtraction circuit 354 based on the control command START=1. An analog output signal SWB–Sy is output from the subtraction circuit 354. Contrary to this, an analog output signal (i.e. a wobble signal) SWB is output from the subtraction circuit 354 based on the control command START=0.

As a result of the above processing, it is possible to subtract the analog signal Sy for the synthetic interference information (i.e. crosstalk information) y generated by the pre-format addresses adjacent to the target pre-format address from the wobble signal SWB of which band has been limited. In this manner, as is the case of the first example, only the information Z1 recorded in the target pre-format address can be obtained from the information Z0 read from the optical disc 10. Even if the light beam is applied across the adjacent information recording layers in accordance with the increase in a storage density of the optical disc, the occurrence of crosstalk can be prevented, as is the case of the first example.

What is claimed is:

1. An optical disc reproducing apparatus for reading information from an optical disc in which addresses are formed beforehand and into which the information has been recorded based on the addresses, comprising:

an information reading device for emitting a light beam to the optical disc, so as to read a target address and the recorded information from the optical disc and to output the read information; and an operation device for operating addresses adjacent to the target address, which has been input from the information reading device at its inner and outer peripheral sides, and after that, for operating interference information generated by the addresses adjacent to the target address at its inner and outer peripheral sides to subtract the interference information from the read information obtained from the target address.

2. The apparatus according to claim 1, wherein the addresses are indicated by wobble signals obtained by modulating grooves, which are formed in the optical disc, by first and second frequencies, and the operation device operates the interference information by calculating a phase difference and an angular rate of the read information of each of the addresses adjacent to the target pre-format address at its inner and outer peripheral sides based on the first and second frequencies.

3. A method for reading information recorded in an optical disc in which addresses are formed beforehand and into which the information has been recorded based on the addresses, comprising the steps of:

irradiating the optical disc with a light beam, so as to read a target address and the recorded information to obtain read information;

operating addresses adjacent to the target address at its inner and outer peripheral sides based on the read information;

calculating interference information generated by the addresses adjacent to the target address at its inner and outer peripheral sides; and subtracting the interference information from the read information obtained from the target address.

4. The method according to claim 3, wherein wobble signals obtained by modulating grooves, which are formed in the optical disc by first and second frequencies, indicate the addresses, said method further comprising the step of obtaining a phase difference and an angular rate of the read information of each of the addresses adjacent to the target address at its inner and outer peripheral sides based on the first and second frequencies.

* * * * *

UNITED STATES PATENT AND TRADEMARK OFFICE
CERTIFICATE OF CORRECTION

PATENT NO.    : 6,377,525 B1
DATED         : April 23, 2002
INVENTOR(S)   : Michihiko Iida It is certified that error appears in the above-identified patent and that said Letters Patent is hereby corrected as shown below:

<u>Column 7,</u>
Lines 7 and 9, delete "degree" and insert in its place -- degrees --.

<u>Column 8,</u>
Line 25, delete the second "the" in the line.
Line 66, delete "byte" and insert in its place -- bytes --.

<u>Column 9,</u>
Line 60, delete "an" and insert in its place -- a --.

<u>Column 11,</u>
Line 20, delete "temporality" and insert in its place -- temporarily --.
Line 60, delete "the".

<u>Column 12,</u>
Line 9, delete first "a" in the line.

<u>Column 14,</u>
Line 66, delete "temporality" and insert in its place -- temporarily --.

<u>Column 15,</u>
Line 47, delete "00 and" and insert in its place -- and 00 -- between "minutes" and "seconds".

<u>Column 16,</u>
Line 30, delete "1139.68" and insert in its place -- 139.68 --.

UNITED STATES PATENT AND TRADEMARK OFFICE
CERTIFICATE OF CORRECTION

PATENT NO. : 6,377,525 B1
DATED : April 23, 2002
INVENTOR(S) : Michihiko Iida

It is certified that error appears in the above-identified patent and that said Letters Patent is hereby corrected as shown below:

Column 17,
Line 2, delete "1139.68" and insert in its place -- 139.68 --.

Signed and Sealed this

Fourth Day of March, 2003

JAMES E. ROGAN
*Director of the United States Patent and Trademark Office*